United States Patent
Chang et al.

(10) Patent No.: US 12,108,474 B2
(45) Date of Patent: Oct. 1, 2024

(54) DUAL CONNECTIVITY MANAGEMENT METHOD AND COMMUNICATIONS APPARATUS

(71) Applicant: Huawei Technologies Co., Ltd., Shenzhen (CN)

(72) Inventors: Junren Chang, Beijing (CN); Jifeng Li, Shanghai (CN); Shulan Feng, Beijing (CN)

(73) Assignee: HUAWEI TECHNOLOGIES CO, LTD., Shenzhen (CN)

( * ) Notice: Subject to any disclaimer, the term of this patent is extended or adjusted under 35 U.S.C. 154(b) by 349 days.

(21) Appl. No.: 17/704,538

(22) Filed: Mar. 25, 2022

(65) Prior Publication Data

US 2022/0217801 A1 Jul. 7, 2022

Related U.S. Application Data

(63) Continuation of application No. PCT/CN2020/112296, filed on Aug. 29, 2020.

(30) Foreign Application Priority Data

Sep. 27, 2019 (CN) .......................... 201910931116.X

(51) Int. Cl.
*H04L 12/00* (2006.01)
*H04L 1/00* (2006.01)
*H04W 76/15* (2018.01)
*H04W 76/20* (2018.01)

(52) U.S. Cl.
CPC ........... *H04W 76/15* (2018.02); *H04L 1/0025* (2013.01); *H04W 76/20* (2018.02)

(58) Field of Classification Search
CPC .... H04L 1/0025; H04W 76/15; H04W 76/20; H04W 76/34; H04W 76/27
USPC ......................................................... 370/329
See application file for complete search history.

(56) References Cited

U.S. PATENT DOCUMENTS

| | | | |
|---|---|---|---|
| 9,924,556 B2 * | 3/2018 | Aminaka | H04W 76/15 |
| 10,959,281 B2 * | 3/2021 | Chang | H04W 76/15 |
| 11,317,458 B2 | 4/2022 | Belghoul et al. | |
| 11,510,175 B2 | 11/2022 | Zeng et al. | |
| 2015/0092707 A1 | 4/2015 | Kwon | |

(Continued)

FOREIGN PATENT DOCUMENTS

| | | |
|---|---|---|
| CN | 104769986 A | 7/2015 |
| CN | 106686743 A | 5/2017 |
| CN | 109429341 A | 3/2019 |

(Continued)

OTHER PUBLICATIONS

"Suspension of SCG," Agenda Item: 11.10.4.3, Source: Nokia, Nokia Shanghai Bell, WID/SID: LTE_NR_DCCA-Core—Release 16, Document for: Discussion and Decision, 3GPP TSG-RAN WG2 Meeting #106, R2-1906692, Reno, USA, May 13-17, 2019, 3 pages.

*Primary Examiner* — Frantz Coby
(74) *Attorney, Agent, or Firm* — SLATER MATSIL, LLP

(57) ABSTRACT

A dual connectivity management method and device, the method including sending by a terminal device that communicates with a first network device and a second network device in a dual connectivity mode, a first message to the first network device, where the first message indicates or requests deactivation or suspension of the dual connectivity, and deactivating or suspending the dual connectivity.

20 Claims, 9 Drawing Sheets

(56) References Cited

U.S. PATENT DOCUMENTS

2016/0277987 A1  9/2016 Chen et al.
2017/0223763 A1  8/2017 Rahman et al.

FOREIGN PATENT DOCUMENTS

| CN | 109756994 A | 5/2019 |
|----|-------------|--------|
| CN | 110225600 A | 9/2019 |
| WO | 2014162203 A2 | 10/2014 |
| WO | 2015143702 A1 | 10/2015 |
| WO | 2018174791 A1 | 9/2018 |
| WO | 2018182231 A1 | 10/2018 |
| WO | 2018232124 A1 | 12/2018 |
| WO | 2019032002 A1 | 2/2019 |
| WO | 2019057269 A1 | 3/2019 |
| WO | 2020251815 A1 | 12/2020 |

* cited by examiner

DUAL CONNECTIVITY MANAGEMENT METHOD AND COMMUNICATIONS APPARATUS

CROSS-REFERENCE TO RELATED APPLICATIONS

This application is a continuation of International Application No. PCT/CN2020/112296, filed on Aug. 29, 2020, which claims priority to Chinese Patent Application No. 201910931116.X, filed on Sep. 27, 2019. The disclosures of the aforementioned applications are hereby incorporated by reference in their entireties.

TECHNICAL FIELD

This application relates to the wireless communications field, and in particular, to a dual connectivity management method and a communications apparatus.

BACKGROUND

Due to a sharp increase of heavy-traffic services of mobile users, to increase a user throughput and enhance mobility performance, some new upper-layer protocol enhancement schemes are proposed. A dual connectivity (DC) technology is one of the schemes. In dual connectivity, a terminal device may simultaneously establish a communication connection to a master network device and a secondary network device, and implement data transmission between the terminal device and a core network through the master network device and the secondary network device.

In actual application, the dual connectivity may need to be temporarily interrupted for a period of time. For example, when the terminal device is a dual-subscriber identity module (SIM) device, if a secondary SIM card of the terminal device needs to perform some services, dual connectivity of a primary SIM card of the terminal device needs to be deactivated (which may also be described as dual connectivity suspension). After the services of the secondary SIM card are completed, the dual connectivity of the primary SIM card is reactivated (which may also be described as dual connectivity resumption). In the conventional technology, the master network device controls, by using a radio resource control (radio resource control, RRC) reconfiguration message, release and establishment of a communication connection between the terminal device and the secondary network device, to complete dual connectivity deactivation or activation. Because a large delay exists in releasing and re-establishing a communication connection between the terminal device and the secondary network device, the terminal device cannot quickly deactivate or activate the dual connectivity, and a service suspended due to dual connectivity deactivation cannot be quickly resumed and performed. Therefore, how to improve dual connectivity activation and deactivation efficiency and how to ensure continuity of performing a service in dual connectivity become one of urgent technical problems to be resolved.

SUMMARY

Embodiments of this application provide a dual connectivity management method and a communications apparatus. According to the embodiments of this application, dual connectivity activation and deactivation efficiency can be improved, continuity of a communication service in dual connectivity is ensured, and applicability and practicability of a dual connectivity technology are improved.

According to a first aspect, an embodiment of this application provides a dual connectivity management method. The method is applied to a terminal device, and the terminal device communicates with a first network device and a second network device in a dual connectivity mode. The terminal device sends a first message to the first network device. Herein, the first message is used to indicate or request to deactivate or suspend dual connectivity. The terminal device deactivates or suspends the dual connectivity.

In this embodiment of this application, the terminal device may actively request or indicate to the first network device that the terminal device needs to deactivate (also referred to as suspend) or activate (also referred to as resume) the dual connectivity. In addition, when deactivating the dual connectivity, the terminal device does not release an RRC connection or a radio link established between the terminal device and the second network device. It can be ensured that the terminal device can more quickly activate the dual connectivity. This can improve dual connectivity activation and deactivation efficiency, and improve applicability and practicability of a dual connectivity technology.

With reference to the first aspect, in a feasible implementation, the terminal device receives a second message from the first network device or the second network device, and deactivates or suspends the dual connectivity based on the second message. Herein, sending the first message to the first network device to request the first network device to determine whether the dual connectivity can be deactivated can avoid unnecessary dual connectivity deactivation caused by misdetermining of the terminal device, and improve continuity of a service of the terminal device in the dual connectivity.

With reference to the first aspect, in a feasible implementation, the second message includes indication information. The indication information is used to indicate to deactivate a first secondary cell set. Alternatively, the indication information is used to indicate to suspend a connection to a first secondary cell set. The first secondary cell set includes a primary secondary cell and/or one or more secondary cells other than the primary secondary cell.

With reference to the first aspect, in a feasible implementation, the terminal device maintains a radio resource control (RRC) connection between the terminal device and the first network device, and deactivates or suspends an RRC connection between the terminal device and the second network device. Alternatively, the terminal device maintains an RRC connection between the terminal device and the first network device, and disconnects a radio link between the terminal device and the second network device.

With reference to the first aspect, in a feasible implementation, the terminal device suspends or stops communication with the second network device over a first radio bearer. Herein, when suspending communication with a first secondary cell, the terminal device still stores a communications resource occupied by the RRC connection or the radio link established between the terminal device and the second network device through the first secondary cell. In this way, the communications resource does not need to be reallocated to the terminal device in a subsequent dual connectivity activation process. This can improve dual connectivity deactivation and activation efficiency. Alternatively, the terminal device sets a primary path corresponding to the first radio bearer to a master cell group (MCG), and/or the terminal device modifies an uplink data split threshold corresponding to the first radio bearer from a first threshold to a second threshold. Herein, the second threshold is greater than the first threshold. Alternatively, the terminal device suspends communication with the first secondary cell, and maintains radio link monitoring (RLM) for a primary secondary cell in the first secondary cell, where the first secondary cell is a secondary cell communicating with the second network device.

With reference to the first aspect, in a feasible implementation, the terminal device stores data transmission status information of the first radio bearer. Alternatively, the terminal device stores configuration information of the first radio bearer.

With reference to the first aspect, in a feasible implementation, the terminal device determines the first radio bearer between the terminal device and the second network device. The terminal device determines a second radio bearer associated with the first radio bearer. Herein, the second radio bearer is a bearer between the terminal device and the first network device, the second radio bearer is used to transmit a suspended or stopped target communication service between the terminal device and the second network device, and the target communication service is a communication service performed between the terminal device and the second network device over the first radio bearer. Herein, the suspended communication service between the terminal device and the second network device may be continued to be performed by the terminal device over the second radio bearer. This ensures service continuity of the communication service, and can improve applicability and practicality of the dual connectivity technology.

With reference to the first aspect, in a feasible implementation, the terminal device receives a fifth message sent by the first network device. The terminal device determines, based on the fifth message, the second radio bearer associated with the first radio bearer.

With reference to the first aspect, in a feasible implementation, the terminal device suspends or stops communication with the second network device over the first radio bearer. The terminal device performs, over the second radio bearer, communication performed over the first radio bearer.

With reference to the first aspect, in a feasible implementation, the terminal device suspends or stops communication with the first secondary cell on a first link.

With reference to the first aspect, in a feasible implementation, the terminal device suspends communication with the second network device on the first link over the first radio bearer.

Herein, the terminal device suspends only communication on an uplink or a downlink. This can ensure that transmission of some key information between the terminal device and the second network device is not suspended, and reduce impact of dual connectivity deactivation on a service performing capability of the terminal device.

With reference to the first aspect, in a feasible implementation, the first link is an uplink or a downlink.

With reference to the first aspect, in a feasible implementation, the second message includes first link indication information, and the first link indication information is used to indicate the first link.

With reference to the first aspect, in a feasible implementation, the terminal device sends first auxiliary information to the first network device or the second network device. The first auxiliary information includes at least one of the following: a type of a bearer that is requested to be configured, a type of a bearer that is to be preferably configured, configuration priorities of different bearers, configuration priorities of different bearer types, and interruption duration of the dual connectivity. Herein, the terminal device may request, by using the first auxiliary information, the first network device to configure a more appropriate radio bearer for the terminal device. This can avoid a problem that a capability of the terminal device is degraded due to an inappropriate radio bearer configured by the first network device.

With reference to the first aspect, in a feasible implementation, the configuration priorities of the different bearers include a first configuration priority, a second configuration priority, and a third configuration priority that respectively correspond to an SCG bearer, an MCG bearer, and a split bearer. The third configuration priority is the highest.

With reference to the first aspect, in a feasible implementation, the terminal device receives third auxiliary information sent by the first network device or the second network device, and performs radio bearer configuration in the dual connectivity mode based on the third auxiliary information. The third auxiliary information is determined by the first network device or the second network device based on any one of a plurality of pieces of priority information, one or more pieces of radio bearer type information, and identification information of one or more radio bearers.

With reference to the first aspect, in a feasible implementation, the terminal device sends second auxiliary information to the first network device. The second auxiliary information includes at least one of the following: a reason for deactivation or suspension, deactivation or suspension duration, a service type of a trigger service, where the trigger service is a communication service that triggers deactivation or suspension of the dual connectivity, and service duration of the trigger service. Herein, the first auxiliary information is sent to the first network device, so that the first network device can more accurately determine whether the terminal device needs to deactivate the dual connectivity.

With reference to the first aspect, in a feasible implementation, the first network device is a master base station, and the second network device is a secondary base station. Alternatively, the first network device is a secondary base station, and the second network device is a master base station.

With reference to the first aspect, in a feasible implementation, deactivating or suspending the dual connectivity is deactivating or suspending a secondary cell group (SCG), or deactivating or suspending the dual connectivity is deactivating or suspending the second network device.

With reference to the first aspect, in a feasible implementation, the terminal device sends a third message to the first network device. The third message is used to indicate or request to activate or resume the dual connectivity. The terminal device activates or resumes the dual connectivity.

With reference to the first aspect, in a feasible implementation, the terminal device receives a fourth message from the first network device or the second network device. The terminal device activates or resumes the dual connectivity based on the fourth message.

With reference to the first aspect, in a feasible implementation, the terminal device activates or resumes the RRC connection between the terminal device and the second network device, or resumes the radio link between the terminal device and the second network device.

With reference to the first aspect, in a feasible implementation, the terminal device resumes communication over the first radio bearer between the terminal device and the second network device. Alternatively, the terminal device restores the primary path corresponding to the first radio bearer from the MCG to a first cell group, and/or modifies the uplink data split threshold corresponding to the first radio bearer from the second threshold to a third threshold. Herein, the third threshold is less than the second threshold, and the first cell group is a cell group corresponding to the primary path when the dual connectivity is last deactivated or suspended. Alternatively, the terminal device resumes communication with the first secondary cell, and maintains radio link monitoring (RLM) for the primary secondary cell in the first secondary cell.

With reference to the first aspect, in a feasible implementation, activating or resuming the dual connectivity is activating or resuming the SCG, or activating or resuming the dual connectivity is activating or resuming the second network device.

With reference to the first aspect, in a feasible implementation, the terminal device activates or resumes communication with the second network device over the first radio bearer based on the stored data transmission status information of the first radio bearer. Alternatively, the terminal device activates or resumes communication with the second network device over the first radio bearer based on the stored configuration information of the first radio bearer.

With reference to the first aspect, in a feasible implementation, the terminal device suspends communication with the first network device over the second radio bearer. The second radio bearer is associated with the first radio bearer between the terminal device and the second network device, and the second radio bearer is a radio bearer between the terminal device and the first network device. The terminal device activates or resumes communication with the second network device over the first radio bearer.

With reference to the first aspect, in a feasible implementation, the first radio bearer is an SCG bearer or a split bearer.

With reference to the first aspect, in a feasible implementation, the terminal device activates or resumes communication with the first secondary cell on a second link.

With reference to the first aspect, in a feasible implementation, the terminal device activates or resumes communication with the second network device on the second link over the first radio bearer.

With reference to the first aspect, in a feasible implementation, the second link is an uplink or a downlink.

With reference to the first aspect, in a feasible implementation, the fourth message includes second link indication information, and the second link indication information is used to indicate the second link.

According to a second aspect, an embodiment of this application provides a dual connectivity management method. The method is applied to a first network device. The first network device receives a first message sent by a terminal device. The first message is used to indicate or request to deactivate or suspend dual connectivity.

The first network device sends a second message to the terminal device in response to the first message. The second message is used for the terminal device to deactivate or suspend the dual connectivity.

With reference to the second aspect, in a feasible implementation, indication information, where the indication information is used to indicate to deactivate a first secondary cell set or suspend a connection to a first secondary cell set, and the first secondary cell set includes a primary secondary cell and/or one or more secondary cells other than the primary secondary cell.

With reference to the second aspect, in a feasible implementation, the second message includes first link indication information. The first link indication information is used to indicate a first link that is between the terminal device and a second network device and on which communication over a first radio bearer is to be suspended. Alternatively, the first link indication information is used to indicate a first link that is between the terminal device and a first secondary cell and on which communication is to be suspended.

With reference to the second aspect, in a feasible implementation, the first link includes an uplink or a downlink.

With reference to the second aspect, in a feasible implementation, the first network device receives second auxiliary information. The second auxiliary information includes at least one of the following: a reason for deactivation or suspension, deactivation or suspension duration, a service type of a trigger service, where the trigger service is a communication service that triggers deactivation or suspension of the dual connectivity, and service duration of the trigger service.

With reference to the second aspect, in a feasible implementation, the first network device sends third auxiliary information to the terminal device. The third auxiliary information is used for the terminal device to perform radio bearer configuration in a dual connectivity mode. The third auxiliary information is determined by the first network device or the second network device based on any one of a type of a bearer that is requested to be configured, a type of a bearer that is to be preferably configured, configuration priorities of different bearers, and configuration priorities of different bearer types.

With reference to the second aspect, in a feasible implementation, the configuration priorities of the different bearers include a first configuration priority, a second configuration priority, and a third configuration priority that respectively correspond to an SCG bearer, an MCG bearer, and a split bearer. The third configuration priority is the highest.

With reference to the second aspect, in a feasible implementation, the first network device sends a fifth message to the terminal device and the second network device. The fifth message is used for the terminal device and the second network device to determine a second radio bearer associated with the first radio bearer. The first radio bearer is a radio bearer between the terminal device and the second network device, and the second radio bearer is a bearer between the terminal device and the first network device. The second radio bearer is used to transmit a suspended target communication service between the terminal device and the second network device. The target communication service is a communication service performed between the terminal device and the second network device over the first radio bearer.

With reference to the second aspect, in a feasible implementation, the first network device receives a third message sent by the terminal device. The third message is used to indicate or request to activate or resume the dual connectivity. The first network device sends a fourth message to the terminal device in response to the third message. The fourth message is used for the terminal device to activate or resume the dual connectivity.

With reference to the second aspect, in a feasible implementation, the fourth message includes second link indication information. The second link indication information is used to indicate a second link that is between the terminal device and the second network device and on which communication over the first radio bearer is to be activated or resumed. Alternatively, the second link indication information is used to indicate a second link that is between the terminal device and the first secondary cell and on which communication is to be activated or resumed.

With reference to the second aspect, in a feasible implementation, the second link includes an uplink or a downlink.

With reference to the second aspect, in a feasible implementation, the first network device sends a sixth message to the second network device. The sixth message is used for the second network device to deactivate or suspend the dual connectivity.

With reference to the second aspect, in a feasible implementation, the first network device sends a seventh message to the second network device. The seventh message is used for the second network device to activate or resume the dual connectivity.

With reference to the second aspect, in a feasible implementation, the first network device is a master base station, and the second network device is a secondary base station. Alternatively, the first network device is a secondary base station, and the second network device is a master base station.

According to a third aspect, an embodiment of this application provides a dual connectivity management method. The method is applied to a second network device. The second network device receives a sixth message or a seventh message sent by a first network device. The second network device deactivates or suspends dual connectivity based on the sixth message. Alternatively, the second network device activates or resumes dual connectivity based on the seventh message. Herein, the second network device also deactivates or activates a dual connectivity mode. This can avoid a waste of communications resources caused when the second network device still continues to send data or signaling to a terminal device in a case in which the terminal device has deactivated the dual connectivity, or this can avoid a problem such as communication suspension caused when the second network device and the terminal device do not perform activation synchronously. In this way, utilization of the communications resources can be increased.

With reference to the third aspect, in a feasible implementation, the second network device deactivates or suspends an RRC connection between the second network device and the terminal device. Alternatively, the second network device disconnects a radio link between the second network device and the terminal device.

With reference to the third aspect, in a feasible implementation, the second network device determines a first radio bearer between the terminal device and the second network device. The second network device determines a second radio bearer associated with the first radio bearer. The second radio bearer is a bearer between the second network device and a first network device, and the second radio bearer is used to transmit a communication service performed between the terminal device and the second network device over the first radio bearer.

With reference to the third aspect, in a feasible implementation, the first network device is a master base station, and the second network device is a secondary base station. Alternatively, the first network device is a secondary base station, and the second network device is a master base station.

According to a fourth aspect, an embodiment of this application provides a dual connectivity management method. The method is applied to a terminal device. The terminal device determines a first radio bearer between the terminal device and a second network device. The terminal device determines a second radio bearer associated with the first radio bearer. The second radio bearer is a bearer between the terminal device and a first network device, the second radio bearer is used to transmit a suspended or stopped target communication service between the terminal device and the second network device, and the target communication service is a communication service performed between the terminal device and the second network device over the first radio bearer.

In this embodiment of this application, the associated second radio bearer is preconfigured for the first radio bearer between the terminal device and the second network device. In this way, the communication service suspended or stopped over the first radio bearer due to dual connectivity deactivation can be continued to be performed over the second radio bearer. This avoids impact on the terminal device by an interruption of the communication service caused by dual connectivity deactivation, ensures service continuity in dual connectivity, and improves practicability and applicability of a dual connectivity technology.

With reference to the fourth aspect, in a feasible implementation, the terminal device receives a fifth message sent by the first network device. The terminal device determines, based on the fifth message, the second radio bearer associated with the first radio bearer.

With reference to the fourth aspect, in a feasible implementation, the terminal device sends a first message to the first network device. The first message is used to indicate or request to deactivate or suspend dual connectivity. The terminal device deactivates or suspends the dual connectivity.

With reference to the fourth aspect, in a feasible implementation, the terminal device receives a second message from the first network device or the second network device. The terminal device deactivates or suspends the dual connectivity based on the second message.

With reference to the fourth aspect, in a feasible implementation, the second message includes indication information. The indication information is used to indicate to deactivate a first secondary cell set or suspend a connection to a first secondary cell set. The first secondary cell set includes a primary secondary cell and/or one or more secondary cells other than the primary secondary cell.

With reference to the fourth aspect, in a feasible implementation, the terminal device maintains a radio resource control (RRC) connection between the terminal device and the first network device, and deactivates or suspends an RRC connection between the terminal device and the second network device. Alternatively, the terminal device maintains an RRC connection between the terminal device and the first network device, and disconnects a radio link between the terminal device and the second network device.

With reference to the fourth aspect, in a feasible implementation, the terminal device suspends or stops the target communication service performed between the terminal device and the second network device over the first radio bearer. The terminal device transmits the suspended or stopped target communication service over the second radio bearer.

With reference to the fourth aspect, in a feasible implementation, the terminal device suspends the target communication service performed between the terminal device and the second network device on a first link over the first radio bearer. The terminal device transmits the suspended or stopped target communication service on the first link over the second radio bearer.

With reference to the fourth aspect, in a feasible implementation, the first link is an uplink or a downlink.

With reference to the fourth aspect, in a feasible implementation, the second message includes first link indication information, and the first link indication information is used to indicate the first link.

With reference to the fourth aspect, in a feasible implementation, the first radio bearer is an SCG bearer or a split bearer.

With reference to the fourth aspect, in a feasible implementation, the first network device is a master base station, and the second network device is a secondary base station. Alternatively, the first network device is a secondary base station, and the second network device is a master base station.

With reference to the fourth aspect, in a feasible implementation, deactivating or suspending the dual connectivity is deactivating or suspending a secondary cell group (SCG), or deactivating or suspending the dual connectivity is deactivating or suspending the second network device.

With reference to the fourth aspect, in a feasible implementation, the terminal device sends a third message to the first network device. The third message is used to indicate or request to activate or resume the dual connectivity. The terminal device activates or resumes the dual connectivity.

With reference to the fourth aspect, in a feasible implementation, the terminal device receives a fourth message from the first network device or the second network device, and activates or resumes the dual connectivity based on the fourth message.

With reference to the fourth aspect, in a feasible implementation, the terminal device activates or resumes the RRC connection between the terminal device and the second network device, or resumes the radio link between the terminal device and the second network device.

With reference to the fourth aspect, in a feasible implementation, the terminal device resumes transmitting the communication service between the terminal device and the second network device over the first radio bearer.

With reference to the fourth aspect, in a feasible implementation, activating or resuming the dual connectivity is activating or resuming the SCG, or activating or resuming the dual connectivity is activating or resuming the second network device.

With reference to the fourth aspect, in a feasible implementation, the terminal device activates or resumes communication with the second network device over the first radio bearer based on stored data transmission status information of the first radio bearer. Alternatively, the terminal device activates or resumes communication with the second network device over the first radio bearer based on stored configuration information of the first radio bearer.

With reference to the fourth aspect, in a feasible implementation, the terminal device activates or resumes communication with the second network device on a second link over the first radio bearer.

With reference to the fourth aspect, in a feasible implementation, the second link is an uplink or a downlink.

With reference to the fourth aspect, in a feasible implementation, the fourth message includes second link indication information, and the second link indication information is used to indicate the second link.

According to a fifth aspect, a dual connectivity management method is provided. The method is applied to a first network device. The first network device determines a fifth message. The first network device sends the fifth message to a terminal device and a second network device. The fifth message is used for the terminal device and the second network device to determine a second radio bearer associated with a first radio bearer. The first radio bearer is a radio bearer between the terminal device and the second network device, and the second radio bearer is a radio bearer between the first network device and the terminal device. The second radio bearer is used to transmit a suspended or stopped target communication service between the terminal device and the second network device. The target communication service is a communication service performed between the terminal device and the second network device over the first radio bearer.

With reference to the fifth aspect, in a feasible implementation, the first network device receives a first message sent by the terminal device. The first message is used to indicate or request to deactivate or suspend dual connectivity. The first network device sends a second message to the terminal device in response to the first message. The second message is used for the terminal device to deactivate or suspend the dual connectivity.

With reference to the fifth aspect, in a feasible implementation, the first network device receives a third message sent by the terminal device. The third message is used to indicate or request to activate or resume the dual connectivity. The first network device sends a fourth message to the terminal device in response to the third message. The fourth message is used for the terminal device to activate or resume the dual connectivity.

With reference to the fifth aspect, in a feasible implementation, the second message includes indication information. The indication information is used to indicate to deactivate a first secondary cell set or suspend a connection to a first secondary cell set. The first secondary cell set includes a primary secondary cell and/or one or more secondary cells other than the primary secondary cell.

With reference to the fifth aspect, in a feasible implementation, the second message includes first link indication information. The first link indication information is used to indicate a first link that is between the terminal device and the second network device and on which communication over the first radio bearer is to be suspended.

With reference to the fifth aspect, in a feasible implementation, the fourth message includes second link indication information. The second link indication information is used to indicate a second link that is between the terminal device and the second network device and on which communication is to be resumed.

With reference to the fifth aspect, in a feasible implementation, the first link is an uplink or a downlink, and the second link is an uplink or a downlink.

According to a sixth aspect, an embodiment of this application provides a dual connectivity management method. The method is applied to a second network device. The second network device receives a fifth message sent by a first network device. The second network device determines a second radio bearer based on the fifth message. The second radio bearer is used to transmit a suspended target communication service between the second network device and a terminal device. The target communication service is a communication service performed between the terminal device and the second network device over a first radio bearer.

With reference to the sixth aspect, in a feasible implementation, a sixth message is received from the first network device. The second network device deactivates or suspends dual connectivity based on the sixth message, or activates or resumes a dual connectivity based on a seventh message.

With reference to the sixth aspect, in a feasible implementation, the sixth message includes indication information, and the indication information is used to indicate to deactivate a first secondary cell set or suspend a connection to a first secondary cell set. The first secondary cell set includes a primary secondary cell and/or one or more secondary cells other than the primary secondary cell.

With reference to the sixth aspect, in a feasible implementation, the second network device deactivates or suspends an RRC connection between the second network device and the terminal device, or disconnects a radio link between the second network device and the terminal device.

With reference to the sixth aspect, in a feasible implementation, the second network device suspends communication with the terminal device over the first radio bearer. The second network device communicates with the terminal device over the second radio bearer.

With reference to the sixth aspect, in a feasible implementation, the second network device obtains the seventh message sent by the first network device. The second network device activates or resumes the dual connectivity based on the seventh message.

With reference to the sixth aspect, in a feasible implementation, the second network device activates or resumes the RRC connection between the second network device and the terminal device, or resumes the radio link between the second network device and the terminal device.

With reference to the sixth aspect, in a feasible implementation, the second network device suspends communication with the terminal device over the second radio bearer. The second network device activates or resumes communication with the terminal device over the first radio bearer.

According to a seventh aspect, an embodiment of this application provides a communications apparatus. The communications apparatus may be the terminal device in the first aspect. The communications apparatus includes a transceiver unit and a processing unit. The transceiver unit is configured to send a first message to a first network device. The first message is used to indicate or request to deactivate or suspend dual connectivity. The processing unit is configured to deactivate or suspend the dual connectivity.

With reference to the seventh aspect, in a feasible implementation, the processing unit is configured to deactivate or suspend the dual connectivity based on a second message. The second message is from the first network device or a second network device.

With reference to the seventh aspect, in a feasible implementation, the second message includes indication information. The indication information is used to indicate to deactivate a first secondary cell set. Alternatively, the indication information is used to indicate to suspend a connection to a first secondary cell set. The first secondary cell set includes a primary secondary cell and/or one or more secondary cells other than the primary secondary cell.

With reference to the seventh aspect, in a feasible implementation, the processing unit maintains a radio resource control (RRC) connection between the communications apparatus and the first network device, and deactivates or suspends an RRC connection between the communications apparatus and the second network device. Alternatively, the processing unit maintains an RRC connection between the communications apparatus and the first network device, and disconnects a radio link between the communications apparatus and the second network device.

With reference to the seventh aspect, in a feasible implementation, the processing unit suspends or stops communication with the second network device over a first radio bearer. Alternatively, the processing unit sets a primary path corresponding to the first radio bearer to a master cell group (MCG), and/or the processing unit modifies an uplink data split threshold corresponding to the first radio bearer from a first threshold to a second threshold. Herein, the second threshold is greater than the first threshold. Alternatively, the processing unit suspends communication with a first secondary cell, and maintains radio link monitoring (RLM) for a primary secondary cell in the first secondary cell, where the first secondary cell is a secondary cell communicating with the second network device.

With reference to the seventh aspect, in a feasible implementation, the processing unit stores data transmission status information of the first radio bearer. Alternatively, the processing unit stores configuration information of the first radio bearer.

With reference to the seventh aspect, in a feasible implementation, the processing unit determines the first radio bearer between the communications apparatus and the second network device. The processing unit determines a second radio bearer associated with the first radio bearer. Herein, the second radio bearer is a bearer between the communications apparatus and the first network device, the second radio bearer is used to transmit a suspended or stopped target communication service between the communications apparatus and the second network device, and the target communication service is a communication service performed between the communications apparatus and the second network device over the first radio bearer.

With reference to the seventh aspect, in a feasible implementation, the transceiver unit receives a fifth message sent by the first network device. The processing unit determines, based on the fifth message, the second radio bearer associated with the first radio bearer.

With reference to the seventh aspect, in a feasible implementation, the processing unit suspends or stops communication with the second network device over the first radio bearer. The transceiver unit transmits, over the second radio bearer, communication performed over the first radio bearer.

With reference to the seventh aspect, in a feasible implementation, the processing unit suspends or stops communication with the first secondary cell on a first link.

With reference to the seventh aspect, in a feasible implementation, the processing unit suspends communication with the second network device on the first link over the first radio bearer.

With reference to the seventh aspect, in a feasible implementation, the first link is an uplink or a downlink.

With reference to the seventh aspect, in a feasible implementation, the second message includes first link indication information, and the first link indication information is used to indicate the first link.

With reference to the seventh aspect, in a feasible implementation, the transceiver unit is configured to send first auxiliary information to the first network device or the second network device. The first auxiliary information includes at least one of the following: a type of a bearer that is requested to be configured, a type of a bearer that is to be preferably configured, configuration priorities of different bearers, configuration priorities of different bearer types, and interruption duration of the dual connectivity.

With reference to the seventh aspect, in a feasible implementation, the configuration priorities of the different bearers include a first configuration priority, a second configuration priority, and a third configuration priority that respectively correspond to an SCG bearer, an MCG bearer, and a split bearer. The third configuration priority is the highest.

With reference to the seventh aspect, in a feasible implementation, the processing unit is configured to receive third auxiliary information sent by the first network device or the second network device. The processing unit is configured to perform radio bearer configuration in a dual connectivity mode based on the third auxiliary information. The third auxiliary information is determined by the first network device or the second network device based on any one of a plurality of pieces of priority information, one or more pieces of radio bearer type information, and identification information of one or more radio bearers.

With reference to the seventh aspect, in a feasible implementation, the transceiver unit is configured to send second auxiliary information to the first network device. The second auxiliary information includes at least one of the following: a reason for deactivation or suspension, deactivation or suspension duration, a service type of a trigger service, where the trigger service is a communication service that triggers deactivation or suspension of the dual connectivity, and service duration of the trigger service.

With reference to the seventh aspect, in a feasible implementation, the first network device is a master base station, and the second network device is a secondary base station. Alternatively, the first network device is a secondary base station, and the second network device is a master base station.

With reference to the seventh aspect, in a feasible implementation, deactivating or suspending the dual connectivity is deactivating or suspending a secondary cell group (SCG), or deactivating or suspending the dual connectivity is deactivating or suspending the second network device.

With reference to the seventh aspect, in a feasible implementation, the transceiver unit is configured to send a third message to the first network device. The third message is used to indicate or request to activate or resume the dual connectivity. The terminal device activates or resumes the dual connectivity.

With reference to the seventh aspect, in a feasible implementation, the transceiver unit receives a fourth message from the first network device or the second network device. The processing unit activates or resumes the dual connectivity based on the fourth message.

With reference to the seventh aspect, in a feasible implementation, the processing unit is configured to activate or resume the RRC connection between the communications apparatus and the second network device, or resume the radio link between the communications apparatus and the second network device.

With reference to the seventh aspect, in a feasible implementation, the processing unit is configured to resume communication with the second network device over the first radio bearer. Alternatively, the processing unit is configured to restore the primary path corresponding to the first radio bearer from the MCG to a first cell group, and/or modify the uplink data split threshold corresponding to the first radio bearer from the second threshold to a third threshold. Herein, the third threshold is less than the second threshold, and the first cell group is a cell group corresponding to the primary path when the dual connectivity is last deactivated or suspended. Alternatively, the processing unit is configured to resume communication with the first secondary cell, and maintain radio link monitoring (RLM) for the primary secondary cell in the first secondary cell.

With reference to the seventh aspect, in a feasible implementation, activating or resuming the dual connectivity is activating or resuming the SCG, or activating or resuming the dual connectivity is activating or resuming the second network device.

With reference to the seventh aspect, in a feasible implementation, the processing unit is configured to activate or resume communication with the second network device over the first radio bearer based on the stored data transmission status information of the first radio bearer. Alternatively, the processing unit is configured to activate or resume communication with the second network device over the first radio bearer based on the stored configuration information of the first radio bearer.

With reference to the seventh aspect, in a feasible implementation, the processing unit is configured to suspend communication with the first network device over the second radio bearer. The second radio bearer is associated with the first radio bearer between the terminal device and the second network device, and the second radio bearer is a radio bearer between the terminal device and the first network device. The processing unit is configured to activate or resume communication with the second network device over the first radio bearer.

With reference to the seventh aspect, in a feasible implementation, the first radio bearer is an SCG bearer or a split bearer.

With reference to the seventh aspect, in a feasible implementation, the processing unit is configured to activate or resume communication with the first secondary cell on a second link.

With reference to the seventh aspect, in a feasible implementation, the processing unit is configured to activate or resume communication with the second network device on the second link over the first radio bearer.

With reference to the seventh aspect, in a feasible implementation, the second link is an uplink or a downlink.

With reference to the seventh aspect, in a feasible implementation, the fourth message includes second link indication information, and the second link indication information is used to indicate the second link.

For technical effects of the seventh aspect or the possible implementations of the seventh aspect, refer to the description of the technical effects of the first aspect or the corresponding implementations of the first aspect.

According to an eighth aspect, an embodiment of this application provides a communications apparatus. The communications apparatus may be the first network device in the second aspect. The communications apparatus includes a transceiver unit and a processing unit. The transceiver unit is configured to receive a first message sent by a terminal device. The first message is used to indicate or request to deactivate or suspend dual connectivity. The transceiver unit is configured to send a second message to the terminal device. The second message is used for the processing unit to deactivate or suspend the dual connectivity.

With reference to the eighth aspect, in a feasible implementation, the second message includes first link indication information. The first link indication information is used to indicate a first link that is between the terminal device and a second network device and on which communication over a first radio bearer is to be suspended. Alternatively, the first link indication information is used to indicate a first link that is between the terminal device and a first secondary cell and on which communication is to be suspended.

With reference to the eighth aspect, in a feasible implementation, the first link includes an uplink or a downlink.

With reference to the eighth aspect, in a feasible implementation, the transceiver unit is configured to receive second auxiliary information. The second auxiliary information includes at least one of the following: a reason for deactivation or suspension, deactivation or suspension duration, a service type of a trigger service, where the trigger service is a communication service that triggers deactivation or suspension of the dual connectivity, and service duration of the trigger service.

With reference to the eighth aspect, in a feasible implementation, the transceiver unit is further configured to send third auxiliary information to the terminal device. The third auxiliary information is used for the terminal device to perform radio bearer configuration in a dual connectivity mode. The third auxiliary information is determined by the processing unit based on any one of a type of a bearer that is requested to be configured, a type of a bearer that is to be preferably configured, configuration priorities of different bearers, and configuration priorities of different bearer types.

With reference to the eighth aspect, in a feasible implementation, the configuration priorities of the different bearers include a first configuration priority, a second configuration priority, and a third configuration priority that respectively correspond to an SCG bearer, an MCG bearer, and a split bearer. The third configuration priority is the highest.

With reference to the eighth aspect, in a feasible implementation, the transceiver unit is configured to send a fifth message to the terminal device and the second network device. The fifth message is used for the terminal device and the second network device to determine a second radio bearer associated with the first radio bearer. The first radio bearer is a radio bearer between the terminal device and the second network device, and the second radio bearer is a bearer between the terminal device and the first network device. The second radio bearer is used to transmit a suspended target communication service between the terminal device and the second network device. The target communication service is a communication service performed between the terminal device and the second network device over the first radio bearer.

With reference to the eighth aspect, in a feasible implementation, the transceiver unit is configured to receive a third message sent by the terminal device. The third message is used to indicate or request to activate or resume the dual connectivity. The transceiver unit is further configured to send a fourth message to the terminal device in response to the third message. The fourth message is used for the terminal device to activate or resume the dual connectivity.

With reference to the eighth aspect, in a feasible implementation, the fourth message includes second link indication information. The second link indication information is used to indicate a second link that is between the terminal device and the second network device and on which communication over the first radio bearer is to be activated or resumed. Alternatively, the second link indication information is used to indicate a second link that is between the terminal device and the first secondary cell and on which communication is to be activated or resumed.

With reference to the eighth aspect, in a feasible implementation, the second link includes an uplink or a downlink.

With reference to the eighth aspect, in a feasible implementation, the transceiver unit is configured to send a sixth message to the second network device. The sixth message is used for the second network device to deactivate or suspend the dual connectivity.

With reference to the eighth aspect, in a feasible implementation, the transceiver unit is further configured to send a seventh message to the second network device. The seventh message is used for the second network device to activate or resume the dual connectivity.

With reference to the eighth aspect, in a feasible implementation, the first network device is a master base station, and the second network device is a secondary base station. Alternatively, the first network device is a secondary base station, and the second network device is a master base station.

For technical effects of the eighth aspect or the possible implementations of the eighth aspect, refer to the description of the technical effects of the second aspect or the corresponding implementations of the second aspect.

According to a ninth aspect, an embodiment of this application provides a communications apparatus. The communications apparatus may be the second network device in the third aspect. The communications apparatus includes a transceiver unit and a processing unit. The transceiver unit is configured to receive a sixth message or a seventh message sent by a first network device. The processing unit is configured to deactivate or suspend dual connectivity based on the sixth message. Alternatively, the processing unit is configured to activate or resume dual connectivity based on the seventh message.

With reference to the ninth aspect, in a feasible implementation, the processing unit is configured to deactivate or suspend an RRC connection between the communications apparatus and a terminal device. Alternatively, the processing unit is configured to disconnect a radio link between the communications apparatus and the terminal device.

With reference to the ninth aspect, in a feasible implementation, the processing unit is configured to determine a first radio bearer between the communications apparatus and the terminal device. The processing unit is further configured to determine a second radio bearer associated with the first radio bearer. The second radio bearer is a bearer between the second network device and a first network, and the second radio bearer is used to transmit a communication service performed between the terminal device and the second network device over the first radio bearer.

With reference to the ninth aspect, in a feasible implementation, the first network device is a master base station, and the second network device is a secondary base station. Alternatively, the first network device is a secondary base station, and the second network device is a master base station.

For technical effects of the ninth aspect or the possible implementations of the ninth aspect, refer to the description of the technical effects of the third aspect or the corresponding implementations of the third aspect.

According to a tenth aspect, an embodiment of this application provides a communications apparatus. The communications apparatus may be the terminal device in the fourth aspect. The communications apparatus includes a transceiver unit and a processing unit. The transceiver unit is configured to receive a fifth message sent by a first network device. The processing unit is configured to determine, based on the fifth message, a second radio bearer associated with a first radio bearer.

With reference to the tenth aspect, in a feasible implementation, the transceiver unit is configured to send a first message to the first network device. The first message is used to indicate or request to deactivate or suspend dual connectivity. The processing unit is configured to deactivate or suspend the dual connectivity.

With reference to the tenth aspect, in a feasible implementation, the transceiver unit is configured to receive a second message from the first network device or a second network device. The processing unit is configured to deactivate or suspend the dual connectivity based on the second message.

With reference to the tenth aspect, in a feasible implementation, the second message includes indication information. The indication information is used to indicate to deactivate a first secondary cell set or suspend a connection to a first secondary cell set. The first secondary cell set includes a primary secondary cell and/or one or more secondary cells other than the primary secondary cell.

With reference to the tenth aspect, in a feasible implementation, the processing unit is configured to maintain a radio resource control (RRC) connection between the communications apparatus and the first network device, and deactivate or suspend an RRC connection between the communications apparatus and the second network device.

Alternatively, the processing unit is configured to maintain an RRC connection between the communications apparatus and the first network device, and disconnect a radio link between the communications apparatus and the second network device.

With reference to the tenth aspect, in a feasible implementation, the processing unit is configured to suspend or stop a target communication service performed between the communications apparatus and the second network device over the first radio bearer. The transceiver unit is configured to transmit the suspended or stopped target communication service over the second radio bearer.

With reference to the tenth aspect, in a feasible implementation, the processing unit is configured to suspend the target communication service performed between the communications apparatus and the second network device on a first link over the first radio bearer. The transceiver unit is configured to transmit the suspended or stopped target communication service on the first link over the second radio bearer.

With reference to the tenth aspect, in a feasible implementation, the first link is an uplink or a downlink.

With reference to the tenth aspect, in a feasible implementation, the second message includes first link indication information, and the first link indication information is used to indicate the first link.

With reference to the tenth aspect, in a feasible implementation, the first radio bearer is an SCG bearer or a split bearer.

With reference to the tenth aspect, in a feasible implementation, the first network device is a master base station, and the second network device is a secondary base station. Alternatively, the first network device is a secondary base station, and the second network device is a master base station.

With reference to the tenth aspect, in a feasible implementation, deactivating or suspending the dual connectivity is deactivating or suspending a secondary cell group (SCG), or deactivating or suspending the dual connectivity is deactivating or suspending the second network device.

With reference to the tenth aspect, in a feasible implementation, the transceiver unit is configured to send a third message to the first network device. The third message is used to indicate or request to activate or resume the dual connectivity. The processing unit is configured to activate or resume the dual connectivity.

With reference to the tenth aspect, in a feasible implementation, the transceiver unit is configured to receive a fourth message from the first network device or the second network device. The processing unit is configured to activate or resume the dual connectivity based on the fourth message.

With reference to the tenth aspect, in a feasible implementation, the processing unit is configured to activate or resume the RRC connection between the communications apparatus and the second network device, or resume the radio link between the communications apparatus and the second network device.

With reference to the tenth aspect, in a feasible implementation, the processing unit is configured to resume transmitting the communication service between the communications apparatus and the second network device over the first radio bearer.

With reference to the tenth aspect, in a feasible implementation, activating or resuming the dual connectivity is activating or resuming the SCG, or activating or resuming the dual connectivity is activating or resuming the second network device.

With reference to the tenth aspect, in a feasible implementation, the processing unit is configured to activate or resume communication with the second network device over the first radio bearer based on stored data transmission status information of the first radio bearer. Alternatively, the processing unit is configured to activate or resume communication with the second network device over the first radio bearer based on stored configuration information of the first radio bearer.

With reference to the tenth aspect, in a feasible implementation, the processing unit is configured to activate or resume communication with the second network device on a second link over the first radio bearer.

With reference to the tenth aspect, in a feasible implementation, the second link is an uplink or a downlink.

With reference to the tenth aspect, in a feasible implementation, the fourth message includes second link indication information, and the second link indication information is used to indicate the second link.

For technical effects of the tenth aspect or the possible implementations of the tenth aspect, refer to the description of the technical effects of the fourth aspect or the corresponding implementations of the fourth aspect.

According to an eleventh aspect, an embodiment of this application provides a communications apparatus. The communications apparatus may be the first network device in the fifth aspect. The communications apparatus includes a transceiver unit and a processing unit. The processing unit is configured to determine a fifth message. The transceiver unit is configured to send the fifth message to a terminal device and a second network device. The fifth message is used for the terminal device and the second network device to determine a second radio bearer associated with a first radio bearer. The first radio bearer is a radio bearer between the terminal device and the second network device, and the second radio bearer is a radio bearer between the communications apparatus and the terminal device. The second radio bearer is used to transmit a suspended or stopped target communication service between the terminal device and the second network device. The target communication service is a communication service performed between the terminal device and the second network device over the first radio bearer.

With reference to the eleventh aspect, in a feasible implementation, the transceiver unit is configured to receive a first message sent by the terminal device. The first message is used to indicate or request to deactivate or suspend dual connectivity. The transceiver unit is further configured to send a second message to the terminal device in response to the first message. The second message is used for the terminal device to deactivate or suspend the dual connectivity.

With reference to the eleventh aspect, in a feasible implementation, the transceiver unit is configured to receive a third message sent by the terminal device. The third message is used to indicate or request to activate or resume the dual connectivity. The transceiver unit is further configured to send a fourth message to the terminal device in response to the third message. The fourth message is used for the terminal device to activate or resume the dual connectivity.

With reference to the eleventh aspect, in a feasible implementation, the second message includes indication information. The indication information is used to indicate to deactivate a first secondary cell or suspend a connection to a first secondary cell set. The first secondary cell set includes a primary secondary cell and/or one or more secondary cells other than the primary secondary cell.

With reference to the eleventh aspect, in a feasible implementation, the second message includes first link indication information. The first link indication information is used to indicate a first link that is between the terminal device and the second network device and on which communication over the first radio bearer is to be suspended.

With reference to the eleventh aspect, in a feasible implementation, the fourth message includes second link indication information. The second link indication information is used to indicate a second link that is between the terminal device and the second network device and on which communication is to be resumed.

With reference to the eleventh aspect, in a feasible implementation, the first link is an uplink or a downlink, and the second link is an uplink or a downlink.

For technical effects of the eleventh aspect or the possible implementations of the eleventh aspect, refer to the description of the technical effects of the fifth aspect or the corresponding implementations of the fifth aspect.

According to a twelfth aspect, an embodiment of this application provides a communications apparatus. The communications apparatus may be the second network device in the sixth aspect. The communications apparatus includes a transceiver unit and a processing unit. The transceiver unit is configured to receive a fifth message sent by a first network device. The processing unit is configured to determine a second radio bearer based on the fifth message. The second radio bearer is used to transmit a suspended target communication service between the second network device and a terminal device. The target communication service is a communication service performed between the terminal device and the second network device over a first radio bearer.

With reference to the twelfth aspect, in a feasible implementation, the transceiver unit is configured to receive a sixth message from the first network device. The processing unit is configured to deactivate or suspend dual connectivity based on the sixth message, or activate or resume a dual connectivity mode based on a seventh message.

With reference to the twelfth aspect, in a feasible implementation, the sixth message includes indication information, and the indication information is used to indicate to deactivate a first secondary cell set or suspend a connection to a first secondary cell set. The first secondary cell set includes a primary secondary cell and/or one or more secondary cells other than the primary secondary cell.

With reference to the twelfth aspect, in a feasible implementation, the processing unit is configured to deactivate or suspend an RRC connection between the communications apparatus and the terminal device, or disconnect a radio link between the communications apparatus and the terminal device.

With reference to the twelfth aspect, in a feasible implementation, the processing unit is configured to suspend communication with the terminal device over the first radio bearer. The transceiver unit is configured to communicate with the terminal device over the second radio bearer.

With reference to the twelfth aspect, in a feasible implementation, the transceiver unit is configured to obtain the seventh message sent by the first network device. The processing unit is configured to activate or resume the dual connectivity based on the seventh message.

With reference to the twelfth aspect, in a feasible implementation, the processing unit is configured to activate or resume the RRC connection between the communications apparatus and the terminal device, or resume the radio link between the communications apparatus and the terminal device.

With reference to the twelfth aspect, in a feasible implementation, the processing unit is configured to suspend communication with the terminal device over the second radio bearer. The processing unit is configured to activate or resume communication with the terminal device over the first radio bearer.

For technical effects of the twelfth aspect or the possible implementations of the twelfth aspect, refer to the description of the technical effects of the sixth aspect or the corresponding implementations of the sixth aspect.

According to a thirteenth aspect, an embodiment of this application provides a communications apparatus. The communications apparatus may be a terminal device, or may be an element or a module such as a chip inside a terminal device. The communications apparatus includes a memory, a processor, and a transceiver. The processor is configured to invoke code stored in the memory, to perform the dual connectivity management method provided in any one of the feasible implementations of the first aspect or the fourth aspect.

According to a fourteenth aspect, an embodiment of this application provides a communications apparatus. The communications apparatus may be a first network device, or may be an element or a module such as a chip inside a first network device. The communications apparatus includes a memory, a processor, and a transceiver. The processor is configured to invoke code stored in the memory, to perform the dual connectivity management method provided in any one of the feasible implementations of the second aspect or the fifth aspect.

According to a fifteenth aspect, an embodiment of this application provides a communications apparatus. The communications apparatus may be a second network device, or may be an element or a module such as a chip inside a second network device. The communications apparatus includes a memory, a processor, and a transceiver. The processor is configured to invoke code stored in the memory, to perform the dual connectivity management method provided in any one of the feasible implementations of the third aspect or the sixth aspect.

According to a sixteenth aspect, an embodiment of this application provides a communications apparatus. The communications apparatus may be a terminal device, or may be an element or a module such as a chip inside a terminal device. The communications apparatus includes a processor and an interface circuit. The interface circuit is configured to receive code instructions and transmit the code instructions to the processor. The processor is configured to run the code instructions, to implement the dual connectivity management method provided in any one of the feasible implementations of the first aspect or the third aspect. In this way, beneficial effects (or advantages) of the dual connectivity management method provided in the first aspect or the fourth aspect can also be implemented.

According to a seventeenth aspect, an embodiment of this application provides a communications apparatus. The communications apparatus may be a first network device, or may be an element or a module such as a chip inside a first network device. The communications apparatus includes a processor and an interface circuit. The interface circuit is configured to receive code instructions and transmit the code instructions to the processor. The processor is configured to run the code instructions, to implement the dual connectivity management method provided in any one of the feasible implementations of the second aspect or the fifth aspect. In this way, beneficial effects (or advantages) of the dual connectivity management method provided in the second aspect or the fifth aspect can also be implemented.

According to an eighteenth aspect, an embodiment of this application provides a communications apparatus. The communications apparatus may be a first network device, or may be an element or a module such as a chip inside a first network device. The communications apparatus includes a processor and an interface circuit. The interface circuit is configured to receive code instructions and transmit the code instructions to the processor. The processor is configured to run the code instructions, to implement the dual connectivity management method provided in any one of the feasible implementations of the third aspect or the sixth aspect. In this way, beneficial effects (or advantages) of the dual connectivity management method provided in the third aspect or the sixth aspect can also be implemented.

According to a nineteenth aspect, an embodiment of this application provides a computer-readable storage medium. The computer-readable storage medium stores instructions. When the instructions are run on a computer, the dual connectivity management method provided in any one of the feasible implementations of the first aspect or the fourth aspect is implemented. In this way, beneficial effects (or advantages) of the dual connectivity management method provided in the first aspect or the fourth aspect can also be implemented.

According to a twentieth aspect, an embodiment of this application provides a computer-readable storage medium. The computer-readable storage medium stores instructions. When the instructions are run on a computer, the dual connectivity management method provided in any one of the feasible implementations of the second aspect or the fifth aspect is implemented. In this way, beneficial effects (or advantages) of the dual connectivity management method provided in the second aspect or the fifth aspect can also be implemented.

According to a twenty-first aspect, an embodiment of this application provides a computer-readable storage medium. The computer-readable storage medium stores instructions. When the instructions are run on a computer, the dual connectivity management method provided in any one of the feasible implementations of the third aspect or the sixth aspect is implemented. In this way, beneficial effects (or advantages) of the dual connectivity management method provided in the third aspect or the sixth aspect can also be implemented.

According to a twenty-second aspect, an embodiment of this application provides a computer program product including instructions. When the computer program product runs on a computer, the computer is enabled to perform the dual connectivity management method provided in the first aspect or the fourth aspect. In this way, beneficial effects of the dual connectivity management method provided in the first aspect or the fourth aspect can also be implemented.

According to a twenty-third aspect, an embodiment of this application provides a computer program product including instructions. When the computer program product runs on a computer, the computer is enabled to perform the dual connectivity management method provided in the second aspect or the fifth aspect. In this way, beneficial effects of the dual connectivity management method provided in the second aspect or the fifth aspect can also be implemented.

According to a twenty-fourth aspect, an embodiment of this application provides a computer program product including instructions. When the computer program product runs on a computer, the computer is enabled to perform the dual connectivity management method provided in the third aspect or the sixth aspect. In this way, beneficial effects of the dual connectivity management method provided in the third aspect or the sixth aspect can also be implemented.

According to a twenty-fifth aspect, an embodiment of this application provides a communications system. The communications system includes the communications apparatuses described in the seventh aspect, the eighth aspect, and the ninth aspect, or the communications apparatuses described in the tenth aspect, the eleventh aspect, and the twelfth aspect, or the communications apparatuses described in the thirteenth aspect, the fourteenth aspect, and the fifteenth aspect, or the communications apparatuses described in the sixteenth aspect, the seventeenth aspect, and the eighteenth aspect.

According to the embodiments of this application, dual connectivity activation and deactivation efficiency can be improved, continuity of a communication service in dual connectivity is ensured, and applicability and practicability of a dual connectivity technology are improved.

DETAILED DESCRIPTION OF ILLUSTRATIVE EMBODIMENTS

Figure 1:
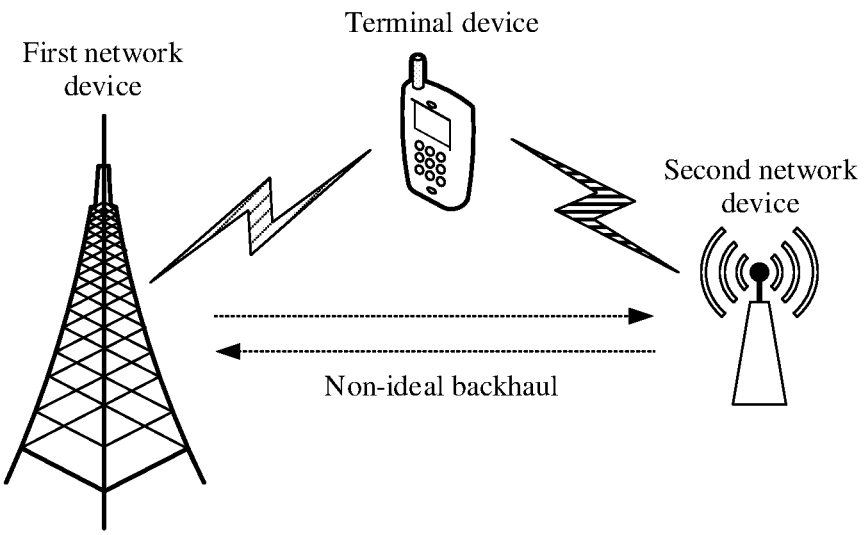
FIG. 1 is a schematic diagram of a structure of a communications system according to an embodiment of this application.

The following clearly describes the technical solutions in the embodiments of this application with reference to the accompanying drawings in the embodiments of this application.

A dual connectivity management method provided in the embodiments of this application is applied to a long term evolution (LTE) system or a fifth generation (5G) system that supports establishment of dual connectivity to a 5G system (also referred to as a new radio (NR) system), and is also applied to other wireless communications systems that use various radio access technologies and can establish dual connectivity to a 5G system, for example, systems using access technologies such as code division multiple access (CDMA), frequency division multiple access (FDMA), time division multiple access (TDMA), orthogonal frequency division multiple access (OFDMA), single-carrier frequency division multiple access (SC-FDMA), and multiple input multiple output (MIMO), and future communications systems. This is not limited herein.

A network device in the embodiments of this application is a device that is deployed in a radio access network (RAN) and that is configured to provide a wireless communications function for a terminal device. The network device may be in various forms such as a macro base station, a micro base station, a relay station, an access point, a base station controller, and a transmission reception point (TRP), or may be a control device that is constituted by one or more base stations and a controller that establishes a communication connection to the one or more base stations. This is not limited herein. For ease of description, a network device is used for unified description in the following descriptions of the embodiments of this application. A terminal device (UE) in this application is a wireless device that supports a dual connectivity mode and can provide voice and/or data connectivity for a user. The wireless device may be a handheld device that supports dual connectivity and that has a wireless connection function, another processing device connected to a wireless modem, or a mobile terminal that communicates with one or more core networks through a radio access network. For example, the wireless terminal may be a mobile phone, a computer, a tablet computer, a personal digital assistant (PDA), a mobile internet device (MID), a wearable device, or an e-book reader. For another example, the wireless device may alternatively be a portable, pocket-sized, handheld, computer built-in, or vehicle-mounted mobile device. For still another example, the wireless device may alternatively be a mobile station or an access point.

It should be noted that both a first network device (also referred to as a master network device) and a second network device (also referred to as a secondary network device) in the embodiments of this application may be network devices in an LTE system, a 5G system, or another wireless communications system. A terminal device in the embodiments of this application may also be a terminal device in an LTE system, a 5G system, or another wireless communications system. This is not specifically limited in this application. For ease of understanding and description, an example in which the first network device, the second network device, and the terminal device are all in a 5G system is used in the embodiments of this application.

For ease of understanding the embodiments of this application, the following briefly describes a plurality of concepts in the embodiments of this application.

1. Dual Connectivity

In wireless communications systems such as an LTE system and an NR system, to provide a higher data transmission rate for a terminal apparatus, and improve spectral efficiency and achieve load balancing by using macro-micro networking, a dual connectivity technology is newly proposed. FIG. 1 is a schematic diagram of a structure of a communications system according to an embodiment of this application. As shown in FIG. 1, in an NR system, a terminal device supporting dual connectivity may simultaneously establish a communication connection to two network devices. The two network devices include a master network device (for example, a master base station (master gNB, MgNB)) and a secondary network device (for example, a secondary base station (secondary gNB, SgNB)). The master network device and the secondary network device may be connected through a non-ideal backhaul (backhaul). In the communications system shown in FIG. 1, the terminal device supporting dual connectivity is configured with at least two cell groups: a master cell group (MCG), and a secondary cell group (SCG). The master cell group is a cell group associated with the master network device. The master cell group includes one primary cell (PCell) and zero or more secondary cells (SCells). The primary cell is a cell that establishes an RRC connection to the terminal apparatus, and the primary cell is configured with a physical uplink control channel (PUCCH) resource. The secondary cell is configured with a PUCCH resource. The secondary cell group is a cell group associated with the secondary network device. The secondary cell group includes one primary secondary cell (PSCell) and zero or more secondary cells. The primary secondary cell is a unique secondary cell configured with a PUCCH resource in the secondary cell group.

2. Radio Bearer (RB)

Briefly, the radio bearer is a set of logical radio resources in the wireless communications system, and can provide a capability of a data connection from the terminal apparatus to a terrestrial radio access network (or a core network) for a user. Based on types of information about bearers, radio bearers may be classified into two types: a signaling radio bearer (SRB) and a data radio bearer (DRB). The signaling radio bearer is mainly used for transmission, and the data radio bearer is mainly used for data transmission. The radio bearer in the embodiments of this application mainly refers to a data radio bearer. In actual application, with reference to a user plane architecture in dual connectivity, the data radio bearer may be further classified. For example, a data radio bearer served only by the master network device may be referred to as an MCG bearer. A data radio bearer provided only by the secondary network device is referred to as an SCG bearer. A data radio bearer served by both the master network device and the secondary network device is referred to as a split (split) bearer.

3. Radio Resource Control (RRC) Status

The terminal device has three RRC statuses: an RRC connected state, an RRC idle state, and an RRC inactive state.

RRC connected state (or referred to as a connected state for short, where "connected state" and "RRC connected state" are a same concept and the two names are interchangeable in this specification): The terminal device establishes an RRC connection to a network, and may perform data transmission.

RRC idle state (or referred to as an idle state for short, where "idle state" and "RRC idle state" are a same concept and the two names are interchangeable in this specification): The terminal device does not establish an RRC connection to the network, and a base station does not store a context of the terminal device. If the terminal device needs to enter the RRC connected state from the RRC idle state, the terminal device needs to initiate an RRC connection establishment process.

RRC inactive state (or referred to as an inactive state for short, where "inactivated state", "deactivated state", "inactive state", "RRC inactive state", and "RRC deactivated state" are a same concept and these names are interchangeable in this specification): The terminal device previously enters the RRC connected state, and then the base station releases the RRC connection, but the base station stores the context of the terminal device. If the terminal device needs to enter the RRC connected state from the RRC inactive state again, the terminal device needs to initiate an RRC connection resume process (or referred to as an RRC connection reestablishment process). Compared with the RRC connection establishment process, the RRC connection resume process has a shorter delay and smaller signaling overheads. However, the base station needs to store the context of the terminal device. This causes storage overheads of the base station.

4. Dual-SIM Device

The dual-SIM device is a terminal device that supports a dual-SIM dual-standby function. A terminal device such as a mobile phone is used as an example. Two subscriber identity module (SIM) cards can be inserted into a dual-SIM mobile phone, and can be in a standby mode at the same time. One of the two SIM cards is a primary SIM card and the other one is a secondary SIM card. In other words, if a subscriber uses a GSM dual-SIM dual-standby mobile phone, the subscriber can use two mobile numbers of a GSM network in one mobile phone at the same time. If a subscriber uses a CDMA dual-SIM dual-standby mobile phone, the subscriber can use two mobile numbers of a CDMA network at the same time. In actual application, dual-card terminal devices may be classified into the following two types:

(1) Dual-SIM Terminal Device Having Dual Receive Modules and Dual Transmit Modules This type of terminal device can simultaneously receive or transmit information through a plurality of mobile networks provided by different operators, and can also simultaneously monitor paging messages in two networks.

(2) Dual-SIM Terminal Device Having Dual Receive Modules and a Single Transmit Module Because this type of terminal device has only a single transmit module, it is very difficult for the terminal device to transmit information through a plurality of mobile networks provided by different operators. However, in actual application, from a cost-efficiency perspective, the dual-SIM terminal device is usually implemented by using a plurality of receive modules and a single transmit module that are shared between two SIMs.

5. Dual Connectivity Deactivation

In the embodiments of this application, dual connectivity deactivation, secondary cell group deactivation, or secondary network device (SN) deactivation are equivalent. A feature of the three equivalents is mainly to suspend current data transmission between a terminal device and an SN or a secondary cell group, but is not to release an RRC connection or a radio link that has been established between the terminal device and the SN or the secondary cell group. Specifically, only uplink service transmission may be suspended, only downlink service transmission may be suspended, or both uplink service transmission and downlink service transmission may be suspended. In addition, in the embodiments of this application, deactivation and suspension are equivalent descriptions, and activation and resumption are equivalent descriptions. For brevity, deactivation or activation is uniformly used for description in the following.

In the communications system shown in FIG. 1, the terminal device communicates with a first network device and a second network device in a dual connectivity mode. Generally, when dual connectivity deactivation (also referred to as suspension) needs to be performed, the first network device may deliver a radio resource control reconfiguration message to the terminal device, to release an RRC connection or a radio link between the terminal device and the second network device. When dual connectivity needs to be activated, the first network device delivers a new RRC reconfiguration message to the terminal device again, to re-establish an RRC connection or a radio link between the terminal device and the second network device. Because a large delay exists in releasing or re-establishing a communication connection between the terminal device and the secondary network device, the terminal device cannot quickly deactivate or activate dual connectivity, and a service suspended due to dual connectivity deactivation cannot be quickly resumed and performed.

A technical problem to be resolved by the method provided in this embodiment of this application is how to improve dual connectivity activation and deactivation efficiency and how to ensure continuity of performing a service in dual connectivity.

Embodiment 1

Figure 2:
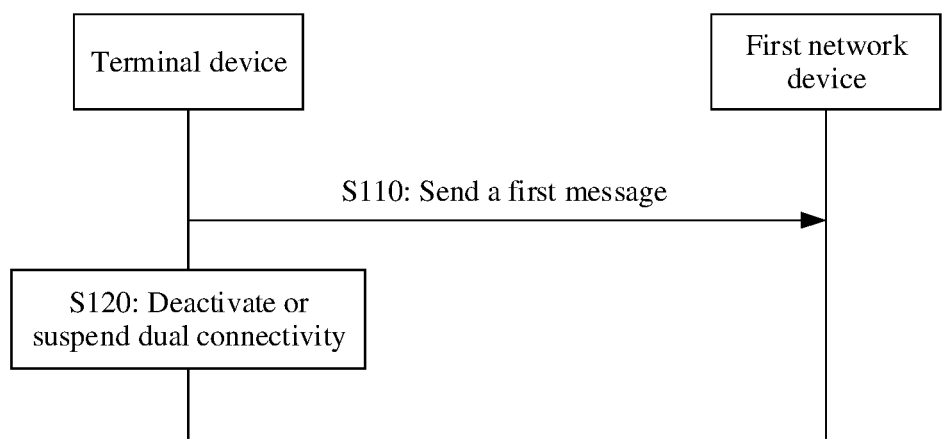
FIG. 2 is a schematic flowchart of a dual connectivity management method according to an embodiment of this application.

FIG. 2 is a schematic flowchart of a dual connectivity management method according to an embodiment of this application. The dual connectivity management method is applied to the wireless communications system shown in FIG. 1. It can be learned from FIG. 2 that the method includes the following steps.

S110: A terminal device sends a first message to a first network device.

In some feasible implementations, in a scenario in which the terminal device communicates with the first network device and a second network device in a dual connectivity mode, when the terminal device determines that dual connectivity needs to be deactivated (also referred to as suspended, where deactivation and suspension have a same meaning and can be used interchangeably in the following description), the terminal device may determine the first message, and send the first message to the first network device. Herein, the first message is used to indicate or request to deactivate or suspend the dual connectivity.

Optionally, in a possible implementation, the terminal device is a dual-SIM device. The terminal device may determine, based on service statuses of a primary SIM card and a secondary SIM card, whether the dual connectivity needs to be deactivated. For example, when the terminal device detects that the secondary SIM card of the terminal device initiates a service request, for example, a service request corresponding to information management system (IMS) registration or a short message service (SMS), the terminal device may determine that the dual connectivity needs to be deactivated. For another example, when the terminal device determines that duration required for performing a service by the secondary SIM card is greater than preset duration, the terminal device may determine that the dual connectivity needs to be deactivated or suspended. In another possible implementation, the terminal device is a single-SIM device. When the terminal device determines, based on information such as a current service traffic and network load of the terminal device, that the dual connectivity does not need to be used, the terminal device may determine that the dual connectivity needs to be deactivated. It should be noted that the terminal device may determine, based on actual usage, whether the dual connectivity needs to be deactivated or suspended. The foregoing determining scenarios are merely examples. This is not limited in this embodiment of this application.

In an optional implementation, the first message is mainly used to remind or prompt the first network device that the terminal device needs to deactivate the dual connectivity. In other words, the terminal device only notifies, by using the first message, the first network device that the terminal device has started or is to start dual connectivity deactivation, and the first network device does not need to further determine whether the terminal device can deactivate the dual connectivity. That is, after sending the first message to the first network device, the terminal device may directly deactivate the dual connectivity, and does not need to wait for the network device to feed back an acknowledgment message before deactivating the dual connectivity. In this way, a dual connectivity deactivation process of the terminal device can be simplified, and dual connectivity deactivation efficiency can be improved.

In another optional implementation, the first message is mainly used for the terminal device to request the first network device to determine whether the terminal device can deactivate the dual connectivity. In specific implementation, after receiving the first message sent by the terminal device, the first network device may determine, based on information such as a service status and a network status of the terminal device, whether the terminal device can deactivate the dual connectivity. Optionally, this embodiment of this application further includes step S1101: If the first network device determines that the terminal device can deactivate the dual connectivity, the first network device sends a second message to the terminal device, to notify the terminal device that the terminal device can deactivate the dual connectivity. If the first network device determines that the terminal device cannot deactivate the dual connectivity, the first network device does not need to feed back any information to the terminal device, or sends negative information to the terminal device, to notify the terminal device that the terminal device cannot deactivate the dual connectivity. Herein, it should be noted that, alternatively, the terminal device may directly send the first message to the second network device or indirectly send the first message to the second network device through the first network device. The second network device may determine and notify the terminal device, by using a same method as the first network device, whether the terminal device can deactivate the dual connectivity. The following provides a description by using an example in which the first network device receives the first message and feeds back the second message. Sending the first message to the first network device to request the first network device to determine whether the dual connectivity can be deactivated can avoid unnecessary dual connectivity deactivation caused by misdetermining of the terminal device, and improve continuity of a service of the terminal device in a dual connectivity state.

Further, in specific implementation, the terminal device may send the first message by using a terminal capability update message or a terminal capability temporary change message. Alternatively, the terminal device may carry the first message by using various media access control control elements (MAC CEs). For example, the terminal device may newly generate a specific media access control control element to send the first message, or the terminal device may send the first message to the first network device or the second network device by using an existing media access control control element such as a buffer status report (BSR). For example, the terminal device may set a reserved bit in the BSR to 0, and then use the BSR as the first message used to request or indicate to deactivate the dual connectivity. It may be understood that the first message may alternatively be carried in another message or signaling. This is not specifically limited in this application.

It should be noted that S110 is an optional step, and step S1101 does not depend on step S110. Specifically, in a possible implementation, alternatively, the terminal device may directly receive the second message from the first network device or the second network device. In other words, the first network device and the second network device may directly send the second message instead of sending the second message after receiving the first message.

In an optional manner, before the first terminal device sends the first message, the first terminal device may further send a piece of auxiliary information to the first network device (for ease of understanding and distinction, first auxiliary information is used as an alternative in the following for description). The first auxiliary information may include one or more of the following: a type of a bearer that is requested by the terminal device to be configured, a type of a bearer that is to be preferably configured, configuration priorities of different bearers, configuration priorities of different bearer types, and interruption duration of the dual connectivity. Herein, the bearer type may specifically include an MCG bearer, an SCG bearer, or a split bearer.

In specific implementation, that the first auxiliary information includes a type of a bearer that is requested to be configured means that the first auxiliary information includes a type of a radio bearer that the terminal device requests the first network device to configure for the terminal device. For example, the first auxiliary information includes the split bearer. To be specific, the terminal device requests the first network device to configure, as the split bearer, a radio bearer used by the first network device. That the first auxiliary information includes a type of a bearer that is to be preferably configured means that the first auxiliary information includes a type of one or more radio bearers, where the type of the one or more radio bearers is a type of a radio bearer preferred or preferred to be used by the terminal device. For example, if the first auxiliary information includes the split bearer and the MCG bearer, it indicates that the terminal device prefers or tends to use the split bearer or the MCG bearer. That the first auxiliary information includes configuration priorities of different bearers means that the first auxiliary information may include a plurality of configuration priorities corresponding to a plurality of radio bearers of a same type or different types. For example, it is assumed that the first auxiliary information includes a first configuration priority corresponding to a first MCG bearer, a second configuration priority corresponding to a second MCG bearer, a third configuration priority corresponding to a first SCG bearer, and a fourth configuration priority corresponding to a second SCG bearer. The fourth configuration priority is the highest, and the first configuration priority is the lowest. If the first auxiliary information sent by the terminal device includes the foregoing content, it indicates that the terminal device requests the first network device to preferentially configure the second SCG bearer for the terminal device as the radio bearer. If the second SCG bearer cannot be configured for the terminal device, the first SCG bearer may be configured for the terminal device, and so on. That the first auxiliary information includes configuration priorities of different bearer types means that the first auxiliary information includes one or more types of radio bearers that the terminal device needs or tends to use, and different types of radio bearers correspond to different configuration priorities. For example, the first auxiliary information may include three radio bearer types: the SCG bearer, the MCG bearer, and the split bearer. The MCG bearer corresponds to a first configuration priority, the SCG bearer corresponds to a second configuration priority, and the split bearer corresponds to a third configuration priority. The third configuration priority is the highest. When sending the first auxiliary information including the foregoing content, the terminal device requests the first network device to preferentially configure the split bearer for the terminal device. If the split bearer cannot be configured, the SCG bearer can be preferentially configured for the terminal device. If the SCG bearer cannot be configured, the MCG bearer can be configured for the terminal device. The interruption duration of the dual connectivity included in the first auxiliary information may be used to assist the first network device in determining a radio bearer appropriate for the terminal device.

In other words, the terminal device may report, to a network by using the first auxiliary information, a type of a bearer that the terminal device requests the network to configure (for example, the MCG bearer, the SCG bearer, or the split bearer), or report, to the network, a type of a bearer that the terminal device prefers or tends to use, or indicate configuration preference priorities of a plurality of radio bearers. Preferably, to ensure service continuity during dual connectivity activation or deactivation, the terminal device may report that a preferred radio bearer (preferred bearer) is the split bearer, or report that a configuration priority of the split bearer is higher than that of the secondary cell group bearer. In addition, the terminal device may further report estimated interruption duration that exists during data transmission in the dual connectivity, and report the estimated interruption duration to the network. For example, for a dual-SIM terminal device, the terminal device may determine interruption duration of dual connectivity based on a service type of a secondary SIM card, and report the interruption duration to the network. For example, if a service that causes dual connectivity deactivation is an SMS service, the terminal device may report interruption duration of 1 s to 3 s.

Further, after receiving the first auxiliary information, the first network device may determine, based on the type of the bearer that is requested to be configured, the type of the bearer that is to be preferably configured, the configuration priorities of different bearers, the configuration priorities of different bearer types, and the interruption duration of the dual connectivity that are included in the first auxiliary information, a radio bearer appropriate for the terminal device, and send bearer configuration information corresponding to the radio bearer to the terminal device, so as to configure, for the terminal device, a radio bearer that the terminal device prefers or tends to use. For example, it is assumed that the type of the bearer that is requested by the terminal device to be configured in the first auxiliary information sent by the terminal device is the split bearer. After receiving the first auxiliary information, the first network device determines that the split bearer can be configured for the terminal device. In this case, the first network device may determine bearer configuration information corresponding to a first split bearer, and send the bearer configuration information to the terminal device. The terminal device may determine an available first split bearer based on the bearer configuration information, and transmit data or signaling over the first split bearer.

Herein, the terminal device may request, by using the first auxiliary information, the first network device to configure a more appropriate radio bearer for the terminal device. This can avoid a problem that a capability of the terminal device is degraded due to an inappropriate radio bearer configured by the first network device.

In another optional implementation, the terminal device may further send second auxiliary information to the first network device. Herein, the second auxiliary information may specifically include at least one of the following: reason information for deactivation or suspension, deactivation or suspension duration information, service type information of a service, and service duration information of a trigger service. Herein, the trigger service is a communication service that triggers the terminal device to deactivate or suspend the dual connectivity, for example, the IMS registration or SMS service on the secondary SIM card that is described above. After receiving the first auxiliary information, the first network device may determine, based on the first auxiliary information, whether the terminal device can deactivate the dual connectivity at a current moment. The first auxiliary information is sent to the first network device, so that the first network device can more accurately determine whether the terminal device needs to deactivate the dual connectivity.

In still another optional implementation, the first network device may send the second message by using a carrier such as a media access control control element (MAC CE) or physical downlink control channel (PDCCH) signaling. Specifically, the second message may be a deactivation MAC CE including a plurality of indication bits. Each indication bit included in the deactivation MAC CE one-to-one corresponds to each secondary cell in a secondary cell group of the terminal device. One indication bit is used to indicate whether one secondary cell needs to be deactivated. For example, it is assumed that an indication bit B1 corresponds to a secondary cell cell1. When a value of the indication bit B1 is 1, it may indicate that the secondary cell cell1 needs to be deactivated. When the indication bit B1 is equal to 0, it may indicate that the secondary cell cell1 remains in a current status. In other words, after the dual connectivity is deactivated, a status of an activated secondary cell in the secondary cell group changes to a deactivated state, and a status of an inactivated secondary cell in the secondary cell group continues to remain a deactivated state. Table 1-1 shows a media access control control element for deactivating or activating a secondary cell according to an embodiment of this application. The table includes 31 indication bits corresponding to a first to thirty-first secondary cells, including c1 to c31. c1 to c31 each are used to indicate a status of a corresponding secondary cell. For example, when a bit is set to 1, it indicates that a corresponding secondary cell is activated, or when a bit is set to 0, it indicates that a corresponding secondary cell is deactivated. For another example, in a deactivation process, if an indication bit is set to 1, it indicates that a secondary cell corresponding to the indication bit should be deactivated, or if an indication bit is set to 0, it indicates that a secondary cell corresponding to the indication bit remains in a current status. In a subsequent activation process, if an indication bit is set to 1, it indicates that a secondary cell corresponding to the indication bit should be activated, or if an indication bit is set to 0, it indicates that a secondary cell corresponding to the indication bit should remain in a current status. It should be noted that the foregoing is merely an application manner of the MAC CE. According to the communication method provided in this embodiment of this application, the first network device may indicate a status of each secondary cell by using the MAC CE. A meaning of a bit may alternatively be set in another manner. This is not limited in this embodiment of this application.

TABLE 1-1

| $c_7$ | $c_6$ | $c_5$ | $c_4$ | $c_3$ | $c_2$ | $c_1$ | R |
|---|---|---|---|---|---|---|---|
| $c_{15}$ | $c_{14}$ | $c_{13}$ | $c_{12}$ | $c_{11}$ | $c_{10}$ | $c_9$ | $c_8$ |
| $c_{23}$ | $c_{22}$ | $c_{21}$ | $c_{20}$ | $c_{19}$ | $c_{18}$ | $c_{17}$ | $c_{16}$ |
| $c_{31}$ | $c_{30}$ | $c_{29}$ | $c_{28}$ | $c_{27}$ | $c_{26}$ | $c_{25}$ | $c_{24}$ |

With reference to the foregoing implementation, the second message may further include a piece of indication information. The indication information may be used to indicate the terminal device to deactivate a first secondary cell set or suspend a connection to a first secondary cell set. Herein, the first secondary cell set may include a primary secondary cell and/or one or more secondary cells (for ease of distinction, a first secondary cell is used as an alternative in the following for description) other than the primary secondary cell. When the first secondary cell set includes the primary secondary cell and/or a plurality of first secondary cells, and the second message uses the MAC CE shown in Table 1-1 as a carrier, an indication bit R may be defined as an indication bit corresponding to the primary secondary cell. When the indication bit R corresponding to the primary secondary cell and an indication bit corresponding to the one or more secondary cells other than the primary secondary cell are 1, the terminal device is indicated to deactivate the dual connectivity. When the indication bits are 0, current statuses of the secondary cells remain unchanged. When the first secondary cell set includes the primary secondary cell, and the second message uses the MAC CE as a carrier, if a value of the indication bit R corresponding to the primary secondary cell in the MAC CE shown in Table 1-1 is 1, the terminal device is indicated to deactivate the dual connectivity. That is, all secondary cells in the secondary cell group are deactivated.

Optionally, an activation or deactivation indication of the primary secondary cell may be designed in a manner similar to a manner of using the indication bit R in Table 1-1. Alternatively, a dedicated MAC CE for activating or deactivating a secondary cell may be used, and a dedicated logical channel identifier is allocated to the MAC CE.

In other words, the terminal device can determine that the first network device allows the terminal device to deactivate the dual connectivity, only when the terminal device determines, based on the second message, that the primary secondary cell and one or more first secondary cells in the secondary cell group need to be deactivated or suspended. Alternatively, the terminal device can determine that the first network device allows the terminal device to deactivate the dual connectivity, only when the terminal device determines, based on the second message, that the primary secondary cell in the secondary cell group needs to be deactivated. In other words, a secondary cell activation or deactivation mechanism is extended herein. When receiving an indication indicating to deactivate or activate both the secondary cell and the primary secondary cell, the terminal device determines to deactivate or activate the dual connectivity. Alternatively, when receiving an indication indicating to activate or deactivate the primary secondary cell, the terminal device determines to activate or deactivate the dual connectivity.

S120: The terminal device deactivates or suspends the dual connectivity.

In some feasible implementations, after sending the first message or receiving the second message sent by the first network device, the terminal device may deactivate or suspend the dual connectivity. Specifically, after the terminal device deactivates the dual connectivity, a radio resource control (RRC) connection between the terminal device and the first network device continues to be maintained, and an RRC connection between the terminal device and the second network device is deactivated or suspended. Alternatively, after the terminal device deactivates the dual connectivity, an RRC connection between the terminal device and the first network device continues to be maintained, and a radio link between the terminal device and the second network device is disconnected.

It should be noted that this embodiment of this application provides a plurality of dual connectivity deactivation methods. The following briefly describes different deactivation methods with reference to different scenarios.

Deactivation Method 1:

In this method, the terminal device may suspend or stop communication performed with the second network device through a part or all of secondary cells in the secondary cell group.

Specifically, after determining that the dual connectivity mode can be deactivated, the terminal device may first determine, based on system configuration information corresponding to the terminal device, N1 secondary cells included in the secondary cell group corresponding to the terminal device. Then, the terminal device may determine N2 first secondary cells from the N1 secondary cells. Herein, N2 is less than or equal to N1, and the first secondary cell is a secondary cell that can communicate with the second network device. In other words, the terminal device can communicate with the second network device through the first secondary cell. Then, the terminal device may suspend communication performed between the terminal device and the second network device through the N2 first secondary cells. Specifically, the terminal device may deactivate or suspend the RRC connection established between the terminal device and the second network device through the N2 first secondary cells. Alternatively, the terminal device may disconnect the radio link established between the terminal device and the second network device through the N2 first secondary cells. In addition, the terminal device may further maintain radio link monitoring (RLM) on the primary secondary cell in the secondary cell group.

When suspending communication with the first secondary cell, the terminal device still stores a communications resource occupied by the RRC connection or the radio link established between the terminal device and the second network device through the first secondary cell. In this way, the communications resource does not need to be reallocated to the terminal device in a subsequent dual connectivity activation process. This can improve dual connectivity deactivation and activation efficiency.

Deactivation Method 2:

In this method, the terminal device may suspend or stop communication with the second network device over a first radio bearer. In actual application, the first radio bearer include an SCG bearer and a split bearer.

In an implementation, the first radio bearer is an SCG bearer. After determining that the dual connectivity needs to be deactivated, the terminal device may suspend or stop communication between the terminal device and the second network device over the SCG bearer. Communication described herein includes signaling interaction and/or data transmission. It should be noted that herein, the terminal device suspends or stops only communication over the SCG bearer, but does not release the communications resource corresponding to the RRC connection or the radio link between the terminal device and the second network device, and does not delete the SCG bearer, either.

In another feasible implementation, the first radio bearer is a split bearer. After determining that the dual connectivity needs to be deactivated, the terminal device may suspend or stop communication between the terminal device and the second network device over the split bearer. Specifically, the terminal device may suspend or stop communication that is between the terminal device and the second network device and that is implemented over a bearer on an SCG side in the split bearer, and communication between that is the terminal device and the first network device and that is implemented over a bearer on an MCG side in the split bearer is not affected. Further, when suspending or stopping communication over the split bearer, the terminal device may further set a primary path of the split bearer from a cell group that is being used to a main cell group MCG. Alternatively, the terminal device may set an uplink data split threshold (ul-data split threshold) corresponding to the split bearer from a first threshold that is currently being used to a second threshold. Herein, the second threshold is far greater than the first threshold. Preferably, the second threshold may be infinite. Herein, setting the uplink data split threshold to infinity can fully ensure that the primary path of the split bearer is the MCG after the dual connectivity is deactivated, and ensure continuity of a service transmitted over the split bearer. Herein, it should be noted that the terminal device may determine, based on the uplink data split threshold, whether the primary path corresponding to the split bearer is the MCG or an SCG. In specific implementation, when an uplink split parameter determined by the terminal device based on information such as a current network status is equal to or greater than the uplink data split threshold, the terminal device may determine that the primary path of the split bearer is the SCG and the MCG. When an uplink split parameter determined by the terminal device is less than the uplink data split threshold, the terminal device may determine that the primary path of the split bearer is the MCG. The terminal device sets the uplink data split threshold corresponding to the split bearer to the second threshold far greater than the first threshold. This can fully ensure that the primary path that is of the split bearer and that is determined by the terminal device is the MCG. Therefore, impact of communication suspension caused by disabling of the bearer on the SCG side in the split bearer can be reduced.

Further, when suspending or stopping communication with the second network device over the SCG bearer or the split bearer, the terminal device may further store data transmission status information corresponding to the SCG bearer or the split bearer. Herein, the data transmission status information mainly includes information about a data packet that has been successfully transmitted, information about a data packet that has not been successfully transmitted, and the like. Alternatively, when suspending communication with the second network device over the SCG bearer or the split bearer, the terminal device may further store configuration information corresponding to the SCG bearer or the split bearer. Herein, the configuration information includes information about the primary path of the split bearer, a preset uplink data split threshold, and the like. This is not specifically limited herein.

The terminal device suspends only communication over the SCG bearer or the split bearer, but does not delete the SCG bearer or the split bearer. Therefore, during subsequent dual connectivity activation, the terminal device may continue to use the SCG bearer or the split bearer without a need of reconfiguring a new radio bearer. This improves dual connectivity deactivation and activation efficiency, and improves practicability and applicability of a dual connectivity technology.

Deactivation Method 3:

In this method, the terminal device may suspend or stop uplink communication or downlink communication performed with the second network device through a part or all of secondary cells in the secondary cell group.

The second message includes first link indication information. The first link indication information is used to indicate a first link that is between the terminal device and the second network device and on which communication is to be suspended. Herein, the first link includes an uplink or a downlink. Based on the first link indication information and the content of the deactivation manner 1, it can be learned that after determining that the dual connectivity needs to be deactivated, the terminal device may determine the first link indication message from the second message, and determine, based on the first link indication message, whether the uplink or the downlink is suspended or stopped. If the terminal device determines, based on the first link indication message, that the uplink is suspended or stopped, the terminal device may suspend or stop performing uplink communication with the second network device on the uplink through the N2 first secondary cells. If the terminal device determines, based on the first link indication message, that the downlink is suspended or stopped, the terminal device may suspend or stop performing downlink communication with the second network device on the downlink through the N2 first secondary cells. For a specific process, refer to a process of suspending communication with the N2 first secondary cells described in the deactivation method 1. Details are not described herein again.

In other words, the first network device may include, in the second message, indication information indicating to deactivate only downlink data of the terminal device, indication information indicating to deactivate only uplink data of the terminal device, or indication information indicating to deactivate uplink data and downlink data of the terminal device.

Deactivation Method 4:

In this method, the terminal device may suspend or stop uplink communication or downlink communication with the second network device over a first radio bearer. In actual application, types of the first radio bearer include an SCG bearer and a split bearer.

As described in the deactivation manner 3, the second message may include first link indication information. The first link indication information may be used to indicate a first link that is between the terminal device and the second network device and on which communication is to be suspended. Herein, the first link includes an uplink or a downlink. Based on the first link indication information and the content of the deactivation method 2, it can be learned that when determining that the dual connectivity needs to be deactivated, the terminal device may extract the first link indication information from the second message, and determine, based on the first link indication information, whether a link on which communication is to be suspended is the uplink or the downlink.

In the following, it is assumed that the first link indication information indicates the uplink. After the terminal device determines that the link to be suspended is the uplink, in a scenario in which the first radio bearer is an SCG bearer, the terminal device may suspend uplink communication performed with the second network device on the uplink over the SCG bearer, or in a scenario in which the first radio bearer is a split bearer, the terminal device may suspend uplink communication performed with the second network device on the uplink over the split bearer. For a specific process, refer to a process of suspending communication over the SCG bearer or the split bearer described in the deactivation method 3. Details are not described herein again.

In the deactivation method 3 or deactivation method 4, the terminal device suspends only communication on the uplink or the downlink. This can ensure that transmission of some key information between the terminal device and the second network device is not suspended, and reduce impact of dual connectivity deactivation on a service performing capability of the terminal device.

Deactivation Method 5:

In this method, the terminal device may suspend or stop a communication service transmitted between the terminal device and the second network device over a first radio bearer, and continue to transmit the communication service over a second radio bearer associated with the first radio bearer.

Before deactivating the dual connectivity, the terminal device may determine the second radio bearer associated with the first radio bearer. Herein, the second radio bearer is a radio bearer between the terminal device and the network device. The second radio bearer is used to transmit a suspended or stopped first communication service. The first communication service is a communication service performed between the terminal device and the second network device over the first radio bearer. In specific implementation, it is assumed that the first radio bearer is a radio bearer A. Before deactivating the dual connectivity, the terminal device may select an MCG bearer (preferably, the MCG bearer is not used) from MCG bearers that have been established between the terminal device and the first network device, and determine the MCG bearer as the second radio bearer associated with the first radio bearer. Alternatively, the terminal device may receive a fifth message from the first network device. Herein, the fifth message is used to indicate the second radio bearer associated with the first radio bearer between the terminal device and the second network device. Then, the terminal device may newly establish an MCG bearer based on radio bearer configuration information included in the fifth message, and determine the newly established MCG bearer as the second radio bearer associated with the first radio bearer. Herein, it should be noted that the established MCG bearer or the newly established MCG bearer may be an independent MCG bearer, or may be an MCG bearer in a secondary node terminated split bearer (that is, a bearer on the MCG side in an SN terminated Split Bearer). This is not specifically limited herein. In a subsequent deactivation process, the second radio bearer is used to replace the disabled first radio bearer between the terminal device and the second network device, so as to ensure continuity of the communication service between the terminal device and the second network device.

In other words, the first network device or the second network device may determine, for a radio bearer related to the secondary cell group, a radio bearer associated with the master cell group. Herein, the radio bearer associated with the secondary cell group mainly includes a secondary cell group bearer, a secondary cell split bearer (SCG split bearer), a master cell split bearer (MCG Split bearer), and a radio bearer based on a secondary cell group packet data convergence protocol (PDCP) (that is, a bearer with SCG PDCP).

Specifically, for the SCG bearer, the first network device or the second network device may configure an associated MCG bearer for the terminal device. The MCG bearer may be a currently existing MCG bearer of the terminal device, or may be a newly established backup MCG bearer of the terminal device. Then, when the dual connectivity is deactivated, the terminal device may switch, to the MCG bearer or a link on the MCG side of the MCG bearer for transmission, data originally mapped to the SCG bearer for transmission. When the dual connectivity is subsequently activated, the terminal device may continue to transmit, on the original SCG bearer instead of the foregoing associated MCG bearer or MCG split bearer, a data flow originally mapped to the SCG bearer.

For the SCG split bearer, when the terminal device deactivates the dual connectivity, the terminal device may map data to the foregoing backup MCG bearer for transmission, or the terminal device may perform data transmission only on an MCG link of the SCG split bearer instead of a link on the SCG side.

Optionally, on the premise that the first radio bearer is associated with the second radio bearer, it can be learned, based on the content of the deactivation method 2, that the terminal device may suspend or stop a communication service performed between the terminal device and the second network device over the SCG bearer (for ease of distinction, a second communication service is used as an alternative in the following for description), and store data transmission status information corresponding to the SCG bearer (for ease of distinction, first data transmission status information is used as an alternative in the following for description). Then, the terminal device may continue to perform the second communication service based on the first data transmission status information over the second radio bearer.

Optionally, on the premise that the first radio bearer is associated with the second radio bearer, it can be learned, based on the content of the deactivation method 4, that after the terminal device determines that the dual connectivity needs to be deactivated, the terminal device may suspend a communication service performed between the terminal device and the second network device over the split bearer (for ease of distinction, a third communication service is used as an alternative in the following for description), and store data transmission status information corresponding to the split bearer (for ease of distinction, second data transmission status information is used as an alternative in the following for description). Then, the terminal device may continue to perform the third communication service based on the second data transmission status information over the second radio bearer.

Further, when suspending communication with the second network device over the SCG bearer or the split bearer and performing communication with the second network device over the second radio bearer, the terminal device may further store configuration information corresponding to the SCG bearer or the split bearer. The configuration information may be used for subsequently activating the dual connectivity. Herein, the configuration information may specifically include information about the primary path of the split bearer, a preset uplink data split threshold, and the like. This is not specifically limited herein.

In the deactivation method 5, the suspended communication service between the terminal device and the second network device may be continued to be performed by the terminal device over the second radio bearer. This ensures service continuity of the communication service, and can improve applicability and practicality of the dual connectivity technology.

Deactivation Method 6:

In this method, the terminal device may suspend or stop uplink communication or downlink communication transmitted between the terminal device and the second network device over a first radio bearer, and continue to transmit uplink communication or downlink communication over a second radio bearer associated with the first radio bearer.

As described in the deactivation method 5, on the premise that the terminal device determines the second radio bearer associated with the first radio bearer, the second message further includes first link indication information used to indicate a first link. The first link includes an uplink or a downlink. The following briefly describes, by using an example in which the first radio bearer is an SCG bearer, a process of deactivating the dual connectivity by the terminal device. After receiving the second message, the terminal device may determine, based on the first link indication message, whether the uplink or the downlink is suspended or stopped. If the terminal device determines, based on the first link indication message, that the uplink is suspended or stopped, the terminal device may suspend or stop uplink communication performed with the second network device over the SCG bearer. In addition, the terminal device may store data transmission status information corresponding to the SCG bearer (for ease of distinction, third data transmission status information is used as an alternative in the following for description). Then, the terminal device may continue to perform, based on the third data transmission status over the second radio bearer, uplink communication originally performed over the first radio bearer. If the terminal device determines, based on the first link indication message, that the downlink is suspended or stopped, the terminal device may suspend or stop downlink communication performed with the second network device over the SCG bearer. In addition, the terminal device may store data transmission status information corresponding to the SCG bearer (for ease of distinction, fourth data transmission status information is used as an alternative in the following for description). Then, the terminal device may continue to perform, based on the fourth data transmission status over the second radio bearer, downlink communication originally performed over the first radio bearer.

In this method, a process of deactivating the dual connectivity by the terminal device in a scenario in which the first radio bearer is a split bearer is similar to the process of deactivating the dual connectivity by the terminal device in a scenario in which the first radio bearer is an SCG bearer. Details are not described again in this application.

In addition, it should be noted that, if the first radio bearer between the terminal device and the second network device uses only the SCG packet data convergence protocol, but does not use a radio bearer of an air interface radio resource of the SCG, in the process of deactivating the dual connectivity by the terminal device, the terminal device does not use the air interface radio resource of the SCG, and therefore, the terminal device can continue to use the current radio bearer. Alternatively, the terminal device may switch a communication service originally performed on the radio bearer to the second radio bearer for performing.

Generally, after receiving dual connectivity deactivation indication information sent by the first network device, the terminal device determines to perform at least one of the following operations, including (1) if a secondary cell group bearer is configured, stopping data transmission over the secondary cell bearer, but maintaining a data transmission status of the secondary cell bearer, (2) if a split bearer is configured, stopping data transmission over the split bearer in the secondary cell group, and/or determining that the primary path is the master cell group, and setting the uplink data split threshold to be infinite, and (3) deactivating all secondary cells in a current secondary cell group, but maintaining RLM monitoring on a primary secondary cell in the secondary cell group.

In addition, after the terminal device receives the dual connectivity deactivation indication information sent by the first network device, if the dual connectivity deactivation indication information includes indication information indicating to deactivate only dual connectivity transmission of downlink data, the terminal device deactivates dual connectivity mode reception of the downlink data based on the indication. Alternatively, if the deactivation indication information includes indication information indicating to deactivate only dual connectivity transmission of uplink data of the terminal device, the terminal device deactivates a dual connectivity transmission mode of the uplink data based on the indication information. Alternatively, if the deactivation indication information includes dual connectivity deactivation indication information of uplink data and dual connectivity deactivation indication information of downlink data, the terminal device deactivates dual connectivity transmission of the uplink data and the downlink data of the terminal device based on the indication.

In step S110 and step S120, when deactivating the dual connectivity, the terminal device suspends or stops only communication with the second network device, but does not release the RRC connection or the radio link established between the terminal device and the second network device. It can be ensured that the terminal device can more quickly activate the dual connectivity subsequently. This improves dual connectivity activation and deactivation efficiency, and improves applicability and practicability of the dual connectivity technology.

Figure 3:
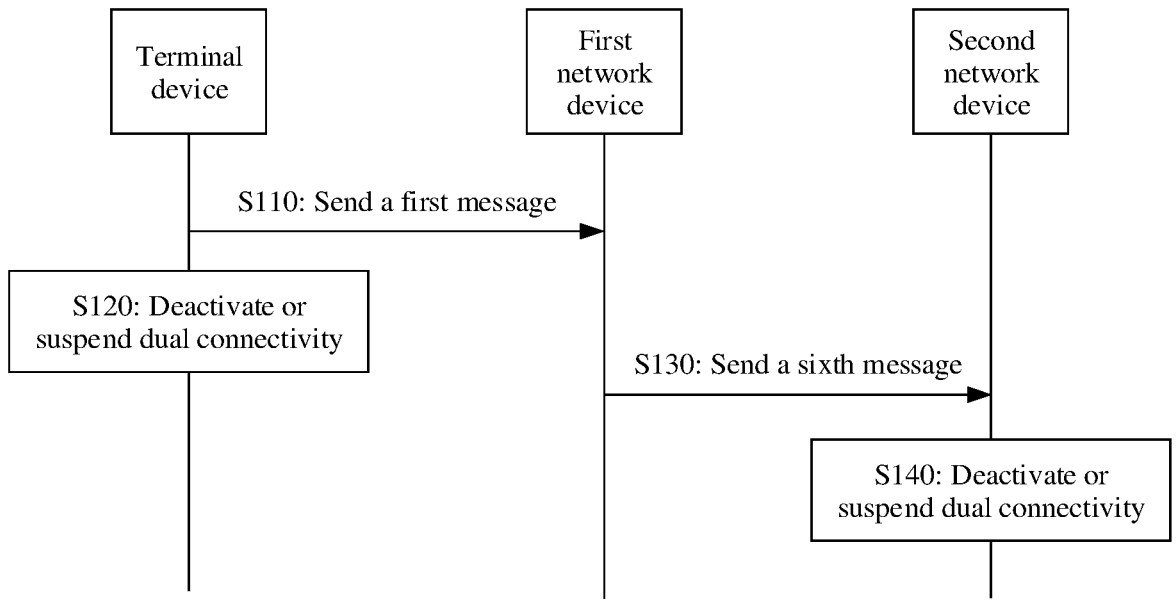
FIG. 3 is another schematic flowchart of a dual connectivity management method according to an embodiment of this application.

FIG. 3 is another schematic flowchart of a dual connectivity management method according to an embodiment of this application. It can be learned from FIG. 3 that the method further includes the following steps.

S130: The first network device sends a sixth message to the second network device.

In some feasible implementations, after receiving the first message and determining that the terminal device can deactivate the dual connectivity, the first network device may send the sixth message to the second network device. The sixth message is used to indicate the second network device to deactivate or suspend the dual connectivity.

In specific implementation, the first network device may send the sixth message to the second network device by using a MAC control element or another carrier. For a specific process, refer to a process of sending the second message to the terminal device by the first network device in the foregoing description. Details are not described herein again. For example, the sixth message may be an activation MAC CE including a plurality of indication bits. Each indication bit included in the activation MAC CE one-to-one corresponds to each secondary cell in a secondary cell group of the terminal device. One indication bit is used to indicate whether one secondary cell needs to be deactivated. For example, it is assumed that an indication bit B1 corresponds to a secondary cell cell1. When a value of the indication bit B1 is 1, it may indicate that the secondary cell cell1 needs to be deactivated. When the indication bit B1 is equal to 0, it may indicate that the secondary cell cell1 remains in a current status. Then, when determining that the dual connectivity can be deactivated or suspended, the second network device may send a deactivation acknowledgment message to the first network device in response to the sixth message.

S140: The second network device deactivates the dual connectivity.

In some feasible implementations, after receiving the sixth message, the second network device may deactivate or suspend the dual connectivity. Herein, it may be understood that, because an operation of deactivating or suspending the dual connectivity is mainly an operation for a radio bearer or a communications link between the terminal device and the second network device, deactivation processes of the terminal device and the second network device are the same. In other words, the second network device may also perform a dual connectivity deactivation operation performed by the terminal device. For example, it is assumed that the terminal device deactivates the dual connectivity by using the deactivation method 1 in the foregoing description. In this case, the second network device may also determine N2 first secondary cells, and suspend communication performed with the terminal device through the N2 first secondary cells. In this way, after the dual connectivity is deactivated, a status of a secondary cell in the secondary cell group is restored to a status of the secondary cell before last deactivation. To be specific, a secondary cell that is in an activated state before last deactivation is restored to the activated state, and a secondary cell that is in a deactivated state before last deactivation remains the deactivated state. Therefore, for a specific process of deactivating the dual connectivity by the second network device, refer to processes of deactivating the dual connectivity that are described in the deactivation method 1, the deactivation method 2, the deactivation method 3, the deactivation method 4, the deactivation method 5, and the deactivation method 6 in the foregoing description. Details are not described herein again. Herein, it should be further noted that, in the scenario corresponding to the deactivation method 6, the sixth message received by the second network device may further include first link indication information. To be specific, in a deactivation process, the second network device may also determine, based on the first link indication information, whether uplink communication or downlink communication is suspended.

Herein, both the terminal device and the second network device deactivate a dual connectivity mode. This can avoid a waste of communications resources caused when the second network device still continues to send data or signaling to the terminal device in a case in which the terminal device has deactivated the dual connectivity. In this way, utilization of the communications resources can be increased.

Figure 4:
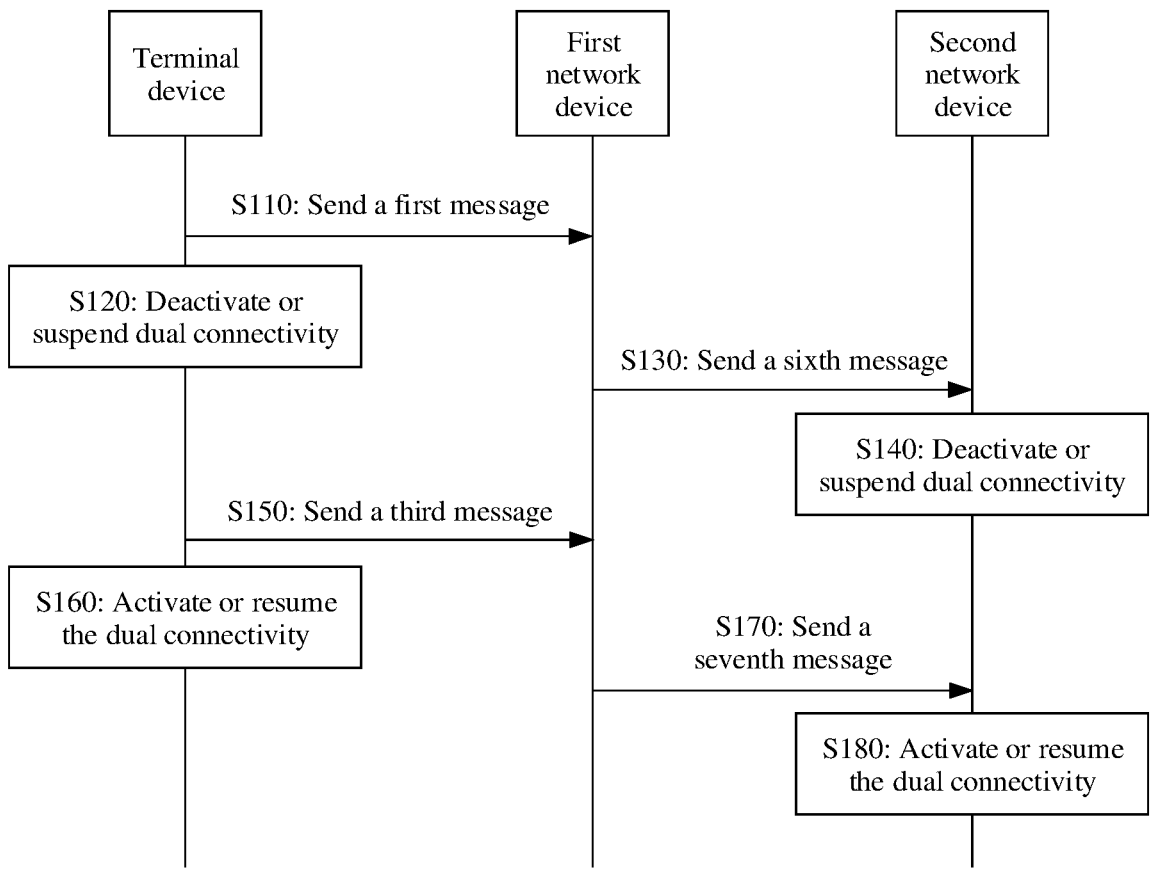
FIG. 4 is another schematic flowchart of a dual connectivity management method according to an embodiment of this application.

FIG. 4 is another schematic flowchart of a dual connectivity management method according to an embodiment of this application. It can be learned from FIG. 4 that the method further includes the following steps.

S150: The terminal device sends a third message to the first network device.

In some feasible implementations, when the terminal device determines that the dual connectivity needs to be activated or resumed (in this application, activation and resumption can be used interchangeably, and activation is used for unified description in the following), the terminal device may send the third message to the first network device. Herein, the third message is used to indicate or request the second network device to activate the dual connectivity.

It should be noted that, in actual application, in a scenario in which the terminal device is a dual-SIM device, if the terminal device determines that the service such as the IMS registration or SMS service initiated by the secondary SIM card of the terminal device is completed, the terminal device may determine that the dual connectivity needs to be activated. Alternatively, when determining that duration corresponding to the service performed on the secondary SIM card is equal to or greater than a preset upper duration limit, the terminal device may determine that the dual connectivity needs to be activated. Alternatively, in a scenario in which the terminal device is a single-SIM device, when the terminal device determines, based on information such as a current service traffic and network load of the terminal device, that the dual connectivity needs to be used, the terminal device may determine to activate the dual connectivity. It may be understood that prerequisites for the terminal device to determine that the dual connectivity needs to be activated are not limited to the foregoing three prerequisites, and other prerequisites may also exist. This is not specifically limited in this application.

In an optional implementation, the third message is mainly used to remind or prompt the first network device that the terminal device needs to activate the dual connectivity. In other words, the terminal device only notifies, by using the third message, the first network device that the terminal device has started or is to start dual connectivity activation, and the first network device does not need to further determine whether the terminal device can activate the dual connectivity. In this way, a dual connectivity activation process of the terminal device can be simplified, and dual connectivity activation efficiency can be improved.

In another optional implementation, the third message is mainly used for the terminal device to request the first network device to determine whether the terminal device can activate the dual connectivity. In specific implementation, after receiving the third message sent by the terminal device, the first network device may determine, based on information such as a service status and a network status of the terminal device, whether the terminal device can activate the dual connectivity. Alternatively, the first network device may determine, based on the duration information or the like that is of the trigger service and that is included in the second auxiliary information, whether the terminal device can activate the dual connectivity. If the first network device determines that the terminal device can activate the dual connectivity, the first network device may send a fourth message to the terminal device, to indicate the terminal device to activate the dual connectivity. If the first network device determines that the terminal device cannot activate the dual connectivity, the first network device may send negative information to the terminal device, to indicate the terminal device that the terminal device cannot activate the dual connectivity. Herein, it should be noted that, alternatively, the terminal device may directly send the third message to the second network device or indirectly send the third message to the second network device through the first network device. The second network device may determine and notify the terminal device, by using a same method as the first network device, whether the terminal device can activate the dual connectivity. The following provides a description by using a specific scenario in which the first network device receives the third message and feeds back the fourth message.

In specific implementation, after determining the fourth message, the first network device may send the fourth message by using a carrier such as a media access control control element (MAC CE) or PDCCH signaling. Herein, the fourth message may be a activation MAC CE including a plurality of indication bits. Each indication bit included in the deactivation MAC CE one-to-one corresponds to each secondary cell in a secondary cell group of the terminal device. One indication bit is used to indicate whether one secondary cell needs to be activated. For example, it is assumed that an indication bit B2 corresponds to a secondary cell cell2. When a value of the indication bit B2 is 1, it may indicate that the secondary cell cell2 needs to be activated.

Certainly, it may be understood that the terminal device may alternatively directly receive the fourth message from the first network device or the second network device. In other words, the first network device and the second network device may directly send the fourth message instead of sending the fourth message after receiving the third message.

S160: The terminal device activates or resumes the dual connectivity.

In some feasible implementations, after sending the third message or receiving the fourth message sent by the first network device, the terminal device may activate or resume the dual connectivity. Specifically, the terminal device may continue to maintain the RRC connection between the terminal device and the first network device, and resume the RRC connection between the terminal device and the second network device. Alternatively, the terminal device may continue to maintain the RRC connection between the terminal device and the first network device, and resume the radio link between the terminal device and the second network device.

The following briefly describes, with reference to the foregoing deactivation process, a plurality of activation methods provided in this embodiment of this application.
Activation Method 1:

This method corresponds to the method described in the deactivation method 1. After determining that the dual connectivity needs to be activated, the terminal device may resume communication performed with the second network device through the N2 first secondary cells. Specifically, the terminal device activates or resumes the RRC connection established between the terminal device and the second network device through the N2 first secondary cells. Alternatively, the terminal device may resume the radio link established between the terminal device and the second network device through the N2 first secondary cells.

Herein, in a process of activating the dual connectivity by the terminal device, a communications resource corresponding to a wireless connection between the terminal device and the second network device does not need to be reconfigured, so that a dual connectivity activation process can be simplified, and dual connectivity activation efficiency can be improved.

In another optional implementation, after determining that the dual connectivity needs to be activated, the terminal device may determine N4 second secondary cells from the secondary cell group. Herein, the second secondary cell is a secondary cell in a deactivated state, or is a secondary cell that is not used between the terminal device and the second network device. Herein, it should be noted that the N4 second secondary cells are different from the N2 first secondary cells. For example, it is assumed that before the dual connectivity is deactivated, the secondary cell group includes five secondary cells: an SCell 1, an SCell 2, an SCell 3, an SCell 4, and an SCell 5. The terminal device communicates with the second network device through the SCell 3, the SCell 4, and the SCell 5 (that is, the SCell 3, the SCell 4, and the SCell 5 are in an activated state, and the SCell 3, the SCell 4, and the SCell 5 are first secondary cells). The SCell 1 and the SCell 2 are not used (that is, the SCell 1 and the SCell 2 are in a deactivated state). In a deactivation process, the terminal device may suspend communication performed with the second network device through the SCell 3, the SCell 4, and the SCell 5. However, in an activation process, the terminal device may select the SCell 1, the SCell 2, and the SCell 3 from the SCell 1, the SCell 2, the SCell 3, the SCell 4, and the SCell 5 as second secondary cells for activation. Straightforwardly, one or more secondary cells in which communication is resumed by the terminal device in the dual connectivity activation process may be different from one or more secondary cells in which communication is suspended by the terminal device in the deactivation process.
Activation Method 2:

This method corresponds to the method described in the deactivation method 2. In an implementation, it is assumed that the first radio bearer is the SCG bearer. After determining that the dual connectivity needs to be activated, the terminal device may directly resume communication between the terminal device and the second network device over the SCG bearer. It should be noted that, when the dual connectivity is deactivated, the terminal device suspends or stops only communication over the SCG bearer, but does not release the communications resource corresponding to the RRC connection or the radio link between the terminal device and the second network device, and does not delete the SCG bearer, either. Therefore, in the activation process, the terminal device does not need to establish a new radio bearer. This improves dual connectivity activation efficiency.

In another feasible implementation, it is assumed that the first radio bearer is the split bearer. After determining that the dual connectivity needs to be activated, the terminal device may resume communication between the terminal device and the second network device over the split bearer. Specifically, the terminal device may resume communication that is between the terminal device and the second network device and that is implemented over the bearer on the SCG side in the split bearer. Further, when resuming communication over the split bearer, the terminal device may further restore the primary path of the split bearer from the master cell group (MCG) to a first cell group. Alternatively, the terminal device may modify the uplink data split threshold (ul-data split threshold) corresponding to the split bearer from the second threshold to a third threshold. Herein, the third threshold is less than the second threshold, and the third threshold may be or may not be equal to the first threshold.

Further, when the terminal device suspends or stops communication with the second network device over the SCG bearer or the split bearer, if the terminal device further stores the data transmission status information or the configuration information corresponding to the SCG bearer or the split bearer, the terminal device may resume communication with the second network device over the SCG bearer or the split bearer based on the data transmission status information or the configuration information.

In the deactivation process, the terminal device suspends only communication over the SCG bearer or the split bearer, but does not delete the SCG bearer or the split bearer. Therefore, during dual connectivity activation, the terminal device may continue to use the SCG bearer or the split bearer without a need of reconfiguring a new radio bearer. This improves dual connectivity deactivation and activation efficiency.

Activation Method 3:

In this method, the fourth message includes second link indication information. The second link indication information is used to indicate whether a second link that is between the terminal device and the second network device and on which communication is to be resumed is an uplink or a downlink. Based on the content of the activation method 1, after determining that the dual connectivity needs to be activated, the terminal device may determine the second link indication information from the fourth message, and determine the second link based on the second link indication information. Then, the terminal device may resume communication performed with the second network device on the second link through the N2 first secondary cells. For a specific process, refer to a communication resuming process described in the activation method 1. Details are not described herein again. Herein, it should be noted that the second link may be the same as or different from the foregoing first link. For example, it is assumed that an initial case is that the terminal device performs downlink communication with the second network device through the SCell 1 and the SCell 2, and in this case, uplink communication is suspended. In the deactivation process, the terminal device may suspend downlink communication performed between the terminal device and the second network device through the SCell 1 and the SCell 2. In the activation process, the terminal device may resume uplink communication performed between the terminal device and the second network device through the SCell 1 and the SCell 2, and downlink communication is still in a suspended or stopped state.

Activation Method 4:

In this method, the terminal device may activate or resume uplink communication or downlink communication with the second network device over the first radio bearer. Based on the content of the activation method 3, when determining that the dual connectivity needs to be activated, the terminal device may extract the second link indication information from the fourth message, and determine, based on the second link indication information, whether the link on which communication is to be resumed is an uplink or a downlink. In the following, it is assumed that the second link indication information indicates the uplink. After the terminal device determines that the link to be resumed is the uplink, in the scenario in which the first radio bearer is an SCG bearer, the terminal device may resume uplink communication performed with the second network device on the uplink over the SCG bearer, or in the scenario in which the first radio bearer is a split bearer, the terminal device may resume uplink communication performed with the second network device on the uplink over the split bearer. For a specific process, refer to a process of resuming communication over the SCG bearer or the split bearer described in the activation method 2. Details are not described herein again. Similarly, the second link herein may be the same as or different from the foregoing first link.

Activation Method 5:

This method corresponds to the deactivation method 5. In the deactivation method 5, before deactivating the dual connectivity, the terminal device may determine the second radio bearer based on the fifth message. Then, in the process of deactivating the dual connectivity, the suspended communication service over the first radio bearer is performed over the second radio bearer as a replacement. Therefore, when the terminal device determines to activate the dual connectivity, the terminal device may suspend or stop the communication service performed between the terminal device and the second network device over the second radio bearer, and store data transmission status information corresponding to the second radio bearer. Then, the terminal device may continue to perform the communication service over the first radio bearer based on the data transmission status information corresponding to the second radio bearer.

Activation Method 6:

This method corresponds to the deactivation method 6. In the process of deactivating the dual connectivity, the terminal device suspends or stops the communication service on the first link over the first radio bearer, and transfers the communication service on the first link to the second radio bearer for performing. When the terminal device determines to activate the dual connectivity, the terminal device may restore, to the first radio bearer for performing, the communication service transmitted on the first link over the second radio bearer. For a specific process, refer to a process of activating the dual connectivity described in the activation method 5. Details are not described herein again.

Generally, after receiving a dual connectivity activation indication, the terminal device may perform at least one of the following operations, including (1) resuming data transmission on the SCG bearer, or resuming data transmission on the split bearer, that is, restoring a configuration of the primary path to a configuration before the deactivation, and restoring the uplink data split threshold to a configuration before the deactivation, and (2) modifying statuses of these previously deactivated secondary cells belonging to the SCG to an activated state.

In addition, if the activation indication indicates the terminal device to activate only dual connectivity transmission in a downlink direction, activate only dual connectivity transmission in an uplink direction, or activate dual connectivity transmission in uplink and downlink directions, correspondingly, based on the indication, the terminal device may activate only dual connectivity transmission in the downlink direction, activate only dual connectivity transmission in the uplink direction, or activate dual connectivity transmission in the uplink and downlink directions.

S170: The first network device sends a seventh message to the second network device.

In some feasible implementations, the first network device may further send the seventh message to the second network device, to indicate the second network device to activate or resume the dual connectivity. For a specific process of sending the seventh message to the second network device by the first network device, refer to the foregoing process of sending the fourth message to the terminal device by the first network device. Details are not described herein again. For example, the seventh message may be a activation MAC CE including a plurality of indication bits. For a definition of the MAC CE, refer to the content in step S110.

S180: The second network device activates or resumes the dual connectivity.

After receiving the seventh message, the second network device may activate or resume the dual connectivity. Herein, it may be understood that, because an operation of activating or resuming the dual connectivity is mainly an operation for the radio bearer or the communications link between the terminal device and the second network device, activation processes of the terminal device and the second network device are the same. In other words, the second network device may also perform a dual connectivity activation operation performed by the terminal device. Therefore, for a specific process of activating the dual connectivity by the second network device, refer to processes of activating the dual connectivity that are described in the activation method 1, the activation method 2, the activation method 3, the activation method 4, the activation method 5, and the activation method 6 in the foregoing description (herein, an object for implementing the methods changes from the terminal device to the second network device). Details are not described herein again.

It should be noted that, in this embodiment of this application, the first network device refers to a master network device (or a master base station), and the second network device refers to a secondary network device (or a secondary base station). In other different scenarios, the first network device may alternatively be a secondary base station, and the second network device may alternatively be a master base station. This is not specifically limited in this application. In addition, when sending information such as the first message and the third message, the terminal device may directly or indirectly send the information to the second network device, and receive feedback information sent by the second network device. This is not specifically limited in this application.

In this embodiment of this application, the terminal device may actively request or indicate to the first network device that the terminal device needs to deactivate or activate the dual connectivity. In addition, in the deactivation process, the terminal device does not release the RRC connection or the radio link established between the terminal device and the second network device. It can be ensured that the terminal device can more quickly activate the dual connectivity. This can improve dual connectivity activation and deactivation efficiency, and improve applicability and practicability of the dual connectivity technology.

Embodiment 2

Figure 5:
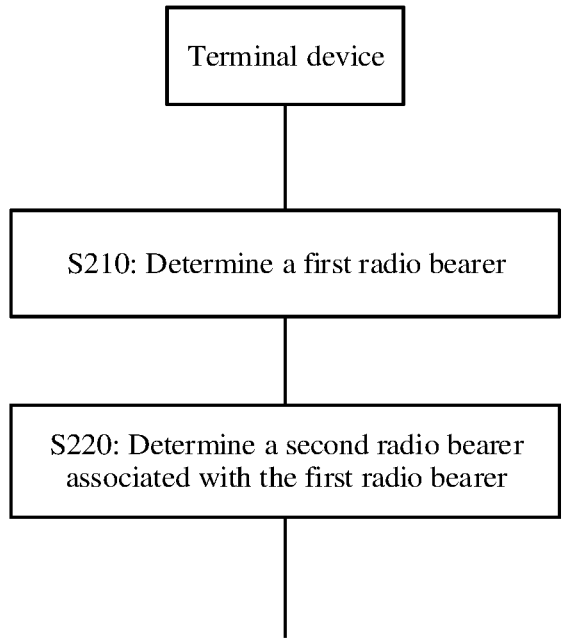
FIG. 5 is another schematic flowchart of a dual connectivity management method according to an embodiment of this application.

FIG. 5 is another schematic flowchart of a dual connectivity management method according to an embodiment of this application. The dual connectivity management method is applied to the wireless communications system shown in FIG. 1. It can be learned from FIG. 5 that the method includes the following steps.

S210: Determine a first radio bearer.

In some feasible implementations, a terminal device may determine, based on system information of the terminal device, a first radio bearer between the terminal device and a second network device. Herein, the first radio bearer includes an SCG bearer or a split bearer. This is not specifically limited in this application.

S220: Determine a second radio bearer associated with the first radio bearer.

In some feasible implementations, after determining the first radio bearer, the terminal device may continue to determine the second radio bearer associated with the first radio bearer. Herein, the second radio bearer is a radio bearer between the terminal device and a first network device. The second radio bearer is used to transmit a suspended or stopped first communication service. The first communication service is a communication service performed between the terminal device and the second network device over the first radio bearer. For example, in specific implementation, it is assumed that the first radio bearer is a radio bearer A. Before deactivating dual connectivity, the terminal device may select an MCG bearer (preferably, the MCG bearer is not used) from MCG bearers that have been established between the terminal device and the first network device, and determine the MCG bearer as the second radio bearer associated with the first radio bearer. Alternatively, the terminal device may receive a fifth message sent by the first network device. Herein, the fifth message is used to indicate the second radio bearer associated with the first radio bearer between the terminal device and the second network device. The fifth message may include radio bearer configuration information. Then, the terminal device may newly establish an MCG bearer based on the radio bearer configuration information included in the fifth message, and determine the newly established MCG bearer as the second radio bearer associated with the first radio bearer. Herein, it should be noted that the established MCG bearer or the newly established MCG bearer may be an independent MCG bearer, or may be an MCG bearer in a secondary node terminated split bearer (that is, a bearer on an MCG side in an SN terminated Split Bearer). This is not specifically limited herein. In a subsequent deactivation process, the second radio bearer is used to replace the disabled first radio bearer between the terminal device and the second network device, so as to ensure continuity of the communication service between the terminal device and the second network device.

Figure 6:
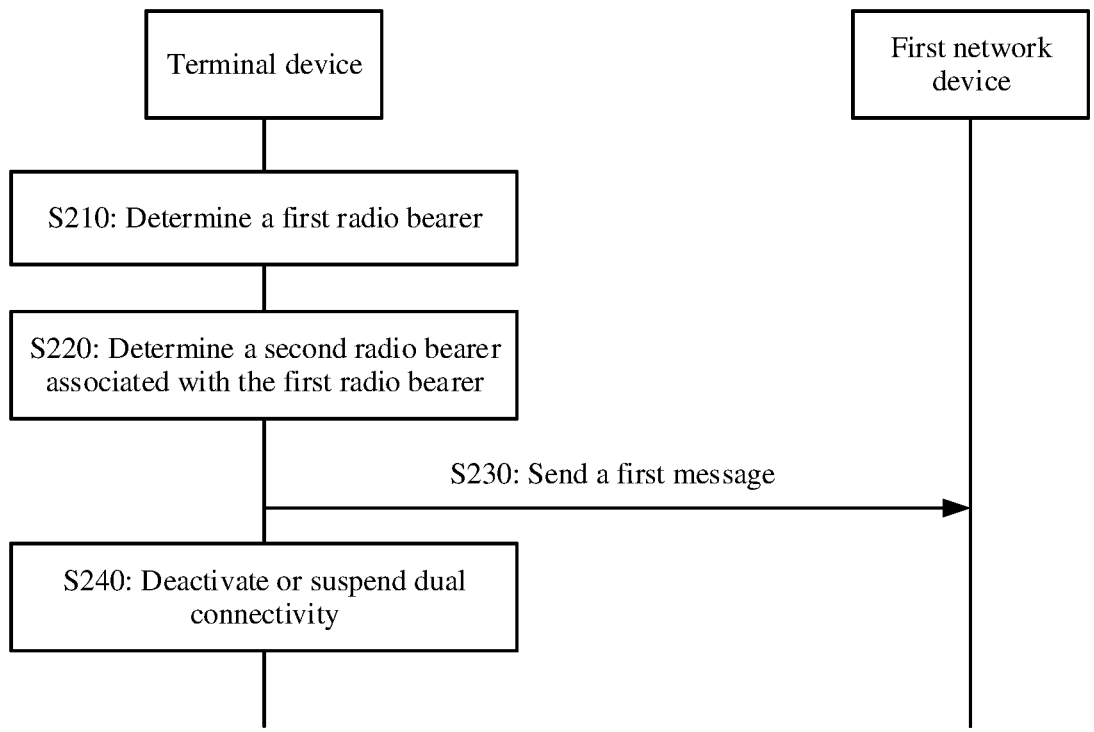
FIG. 6 is another schematic flowchart of a dual connectivity management method according to an embodiment of this application.

FIG. 6 is another schematic flowchart of a dual connectivity management method according to an embodiment of this application. It can be learned from FIG. 6 that the method further includes the following steps.

S230: The terminal device sends a first message to the first network device.

In some feasible implementations, when the terminal device determines that the dual connectivity needs to be deactivated, the terminal device may determine the first message, and send the first message to the first network device. Herein, the first message is used to indicate or request to deactivate or suspend the dual connectivity. Herein, for a specific process of sending the first message to the first network device by the terminal device, refer to the process of sending the first message to the first network device described in step S110 in Embodiment 1. Details are not described herein again.

S240: The terminal device deactivates or suspends the dual connectivity.

In some feasible implementations, after sending the first message or receiving a second message sent by the first network device, the terminal device may deactivate or suspend the dual connectivity. Specifically, after the terminal device deactivates the dual connectivity, a radio resource control (RRC) connection between the terminal device and the first network device continues to be maintained, and an RRC connection between the terminal device and the second network device is deactivated or suspended. Alternatively, after the terminal device deactivates the dual connectivity, an RRC connection between the terminal device and the first network device continues to be maintained, and a radio link between the terminal device and the second network device is disconnected.

In specific implementation, on the premise that the first radio bearer is associated with the second radio bearer, for a process of deactivating or suspending the dual connectivity by the terminal device, refer to the process of deactivating the dual connectivity in the deactivation method 5 or the deactivation method 6 described in step S120 in Embodiment 1. Details are not described herein again.

Figure 7:
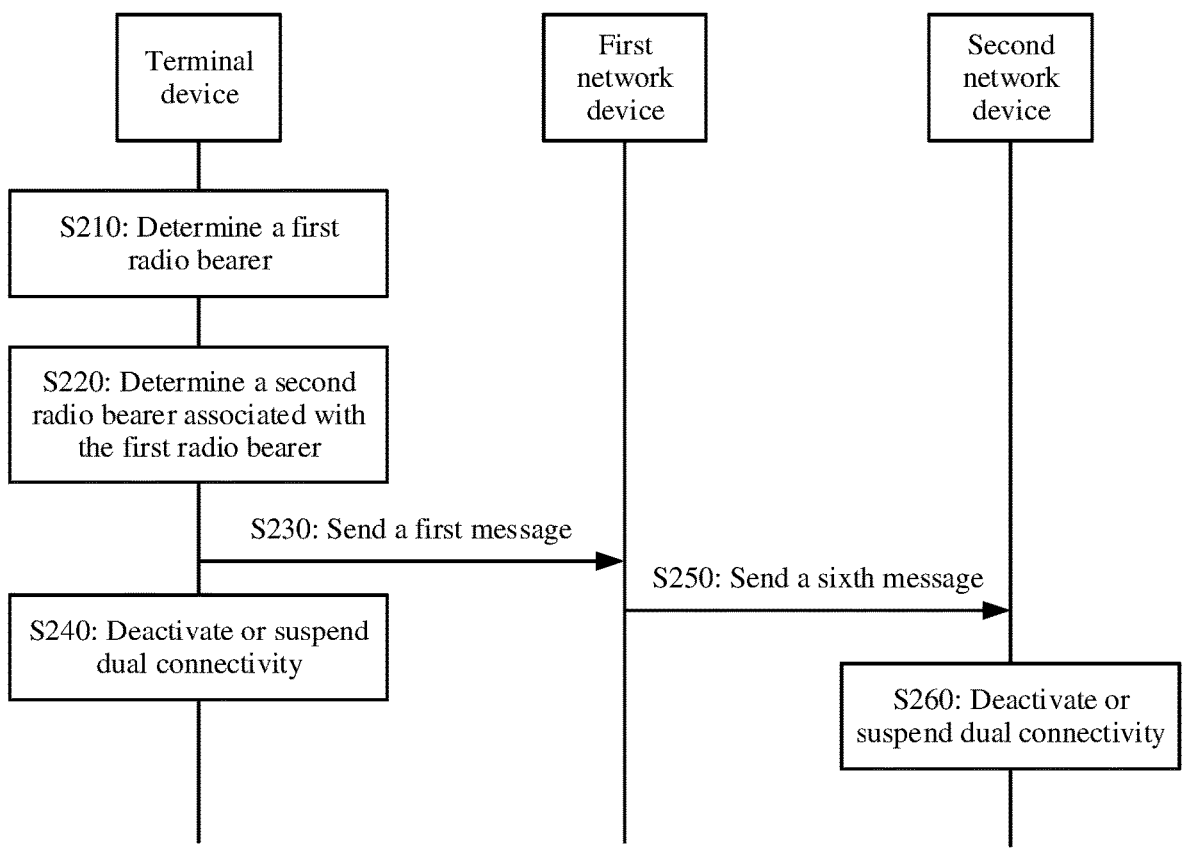
FIG. 7 is another schematic flowchart of a dual connectivity management method according to an embodiment of this application.

FIG. 7 is another schematic flowchart of a dual connectivity management method according to an embodiment of this application. It can be learned from FIG. 7 that the method further includes the following steps.

S250: The first network device sends a sixth message to the second network device.

In some feasible implementations, after receiving the first message and determining that the terminal device can deactivate the dual connectivity, the first network device may send the sixth message to the second network device. The sixth message is used to indicate the second terminal device to deactivate or suspend the dual connectivity. In specific implementation, for a process of sending the sixth message to the second network device by the first network device, refer to the process of sending the sixth message to the second network device by the first network device described in step S130 in Embodiment 1. Details are not described herein again.

S260: The second network device deactivates or suspends the dual connectivity.

In some feasible implementations, after receiving the sixth message, the second network device may deactivate or suspend the dual connectivity. Herein, it may be understood that, because an operation of deactivating or suspending the dual connectivity is mainly an operation for a radio bearer or a communications link between the terminal device and the second network device, deactivation processes of the terminal device and the second network device are the same. On the premise that the first radio bearer is associated with the second radio bearer, for a specific process of deactivating the dual connectivity by the second network device, refer to the process of deactivating the dual connectivity in the deactivation method 5 or the deactivation method 6 described in step S120 in Embodiment 1. Details are not described herein again.

Figure 8:
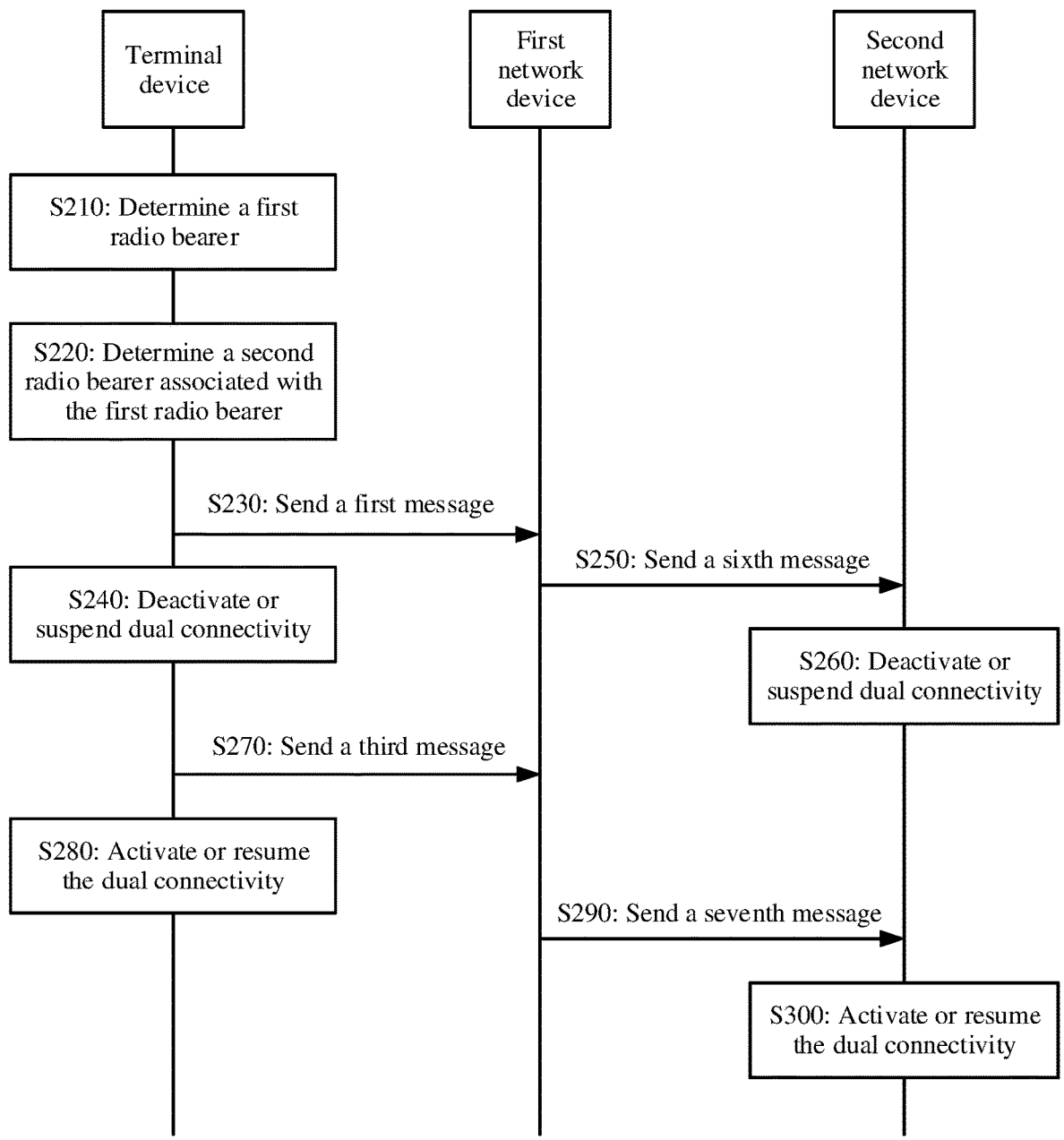
FIG. 8 is another schematic flowchart of a dual connectivity management method according to an embodiment of this application.

FIG. 8 is another schematic flowchart of a dual connectivity management method according to an embodiment of this application. It can be learned from FIG. 8 that the method further includes the following steps.

S270: The terminal device sends a third message to the first network device.

In some feasible implementations, when determining that the dual connectivity needs to be activated or resumed, the terminal device may send the third message to the first network device. Herein, the third message is used to indicate or request the second network device to activate the dual connectivity. In specific implementation, for a process of sending the third message to the first network device by the terminal device, refer to the process of sending the third message to the first network device described in step S150 in Embodiment 1. Details are not described herein again.

S280: The terminal device activates or resumes the dual connectivity.

In some feasible implementations, after sending the third message or receiving a fourth message sent by the first network device, the terminal device may activate or resume the dual connectivity. Specifically, the terminal device may continue to maintain the RRC connection between the terminal device and the first network device, and resume the RRC connection between the terminal device and the second network device. Alternatively, the terminal device may continue to maintain the RRC connection between the terminal device and the first network device, and resume the radio link between the terminal device and the second network device.

In specific implementation, on the premise that the first radio bearer is associated with the second radio bearer, for a specific process of activating or resuming the dual connectivity by the terminal device, refer to the processes of activating or resuming the dual connectivity described in the activation method 5 and the activation method 6 in step S160 in Embodiment 1. Details are not described herein again.

S290: The first network device sends a seventh message to the second network device.

In some feasible implementations, the first network device may further send the seventh message to the second network device, to indicate the second network device to activate or resume the dual connectivity. In specific implementation, for a process of sending the seventh message to the second network device by the first network device, refer to the process of sending the seventh message to the terminal device by the first network device described in step S170 in Embodiment 1. Details are not described herein again.

S300: The second network device activates or resumes the dual connectivity.

In some feasible implementations, after receiving the seventh message, the second network device may activate or resume the dual connectivity. Herein, it may be understood that, because an operation of activating or resuming the dual connectivity is mainly an operation for the radio bearer or the communications link between the terminal device and the second network device, activation processes of the terminal device and the second network device are the same. Therefore, in specific implementation, for a specific process of activating or resuming the dual connectivity by the second network device, refer to the processes of activating or resuming the dual connectivity described in the activation method 5 and the activation method 6 in step S16o in Embodiment 1. Details are not described herein again.

In this embodiment of this application, the associated second radio bearer is preconfigured for the first radio bearer between the terminal device and the second network device. In this way, the communication service suspended or stopped over the first radio bearer due to dual connectivity deactivation can be continued to be performed over the second radio bearer. This avoids impact on the terminal device by a terminal of the communication service caused by dual connectivity deactivation, ensures service continuity in the dual connectivity, and improves practicability and applicability of a dual connectivity technology.

Figure 9:
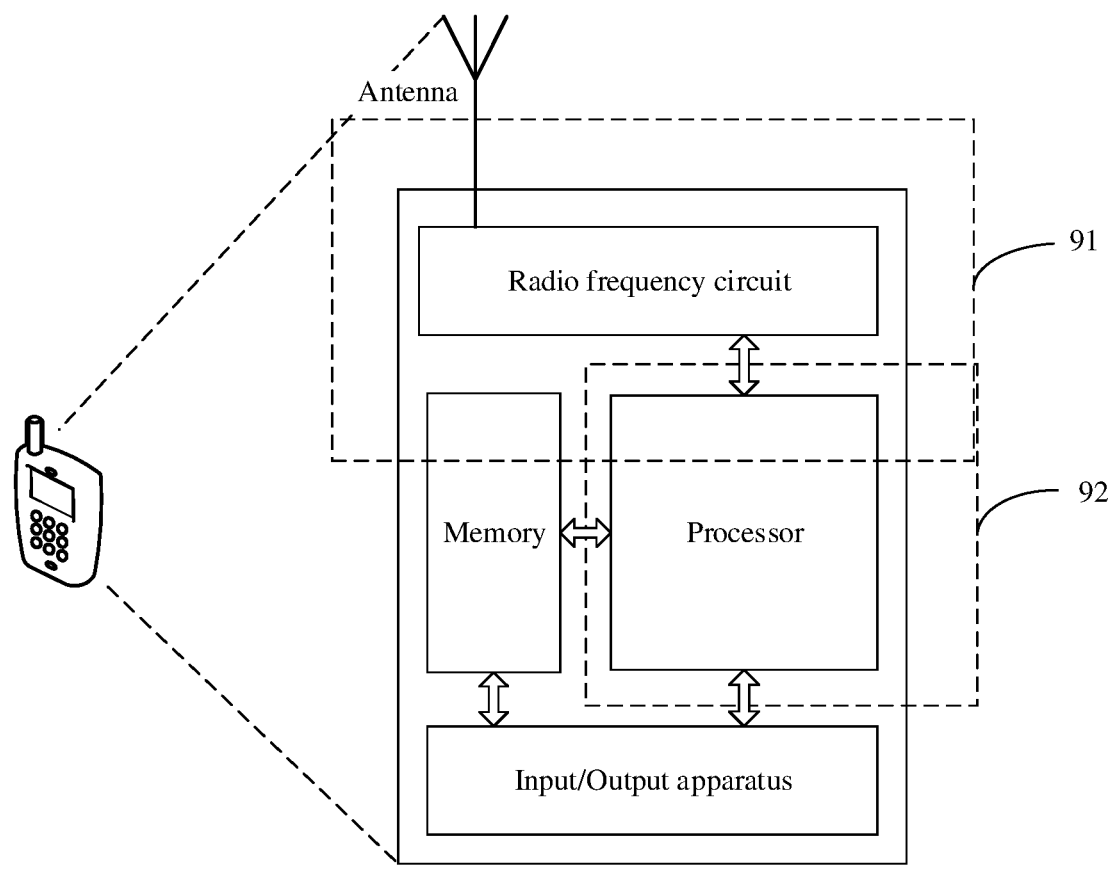
FIG. 9 is a schematic diagram of a structure of a communications apparatus according to an embodiment of this application.

FIG. 9 is a schematic diagram of a structure of a communications apparatus according to an embodiment of this application. The communications apparatus may be configured to perform functions of the terminal device in Embodiment 1. The communications apparatus may be the terminal device, or may be an element or a module inside the terminal device. For ease of description, FIG. 9 shows only main components of the communications apparatus. It can be learned from FIG. 9 that the communications apparatus includes a processor, a memory, a radio frequency circuit, an antenna, and an input/output apparatus. The processor is mainly configured to process a communications protocol and communication data, control an apparatus, execute a software program, process data of the software program, and the like. The memory is mainly configured to store the software program and the data. The radio frequency circuit is mainly configured to perform conversion between a baseband signal and a radio frequency signal, and process the radio frequency signal. The antenna is mainly configured to receive and send a radio frequency signal in a form of an electromagnetic wave. The input/output apparatus, such as a touchscreen, a display, or a keyboard, is mainly configured to receive data input by a user using the apparatus, and output data to the user. It should be noted that, in some scenarios, the communications device may not include the input/output apparatus.

When needing to send data, after performing baseband processing on the to-be-sent data, the processor outputs a baseband signal to the radio frequency circuit, and the radio frequency circuit performs radio frequency processing on the baseband signal and then sends a radio frequency signal to the outside in a form of an electromagnetic wave through the antenna. When data is sent to the apparatus, the radio frequency circuit receives a radio frequency signal through the antenna, converts the radio frequency signal into a baseband signal, and outputs the baseband signal to the processor, and the processor converts the baseband signal into data and processes the data. For ease of description, FIG. 9 shows only one memory and one processor. In an actual apparatus product, there may be one or more processors and one or more memories. The memory may also be referred to as a storage medium, a storage device, or the like. The memory may be disposed independent of the processor, or may be integrated with the processor. This is not limited in this embodiment of this application.

In an optional implementation, the processor may include a baseband processor and/or a central processing unit. The baseband processor is mainly configured to process a communications protocol and communication data. The central processing unit is mainly configured to control an entire apparatus, execute a software program, and process data of the software program. The processor in FIG. 9 may integrate functions of the baseband processor and the central processing unit. A person skilled in the art may understand that the baseband processor and the central processing unit may be alternatively processors independent of each other, and are interconnected by using a technology such as a bus. A person skilled in the art may understand that the apparatus may include a plurality of baseband processors to adapt to different network standards, the apparatus may include a plurality of central processing units to enhance a processing capability of the apparatus, and components of the apparatus may be connected through various buses. The baseband processor may also be expressed as a baseband processing circuit or a baseband processing chip. The central processing unit may also be expressed as a central processing circuit or a central processing chip. A function of processing the communications protocol and the communication data may be built in the processor, or may be stored in a storage unit in a form of a software program. The processor executes the software program, to implement a baseband processing function.

In this embodiment of this application, the antenna and the radio frequency circuit that have a transceiving function may be considered as a transceiver unit of the apparatus, and the processor having a processing function may be considered as a processing unit of the apparatus. As shown in FIG. 9, the communications apparatus includes a transceiver unit 91 and a processing unit 92. Optionally, a component that is in the transceiver unit 91 and that is configured to implement a receiving function may be considered as a receiving unit, and a component that is in the transceiver unit 91 and that is configured to implement a sending function may be considered as a sending unit, that is, the transceiver unit 91 includes a receiving unit and a sending unit. Herein, the receiving unit may also be sometimes referred to as a receiving machine, a receiver, a receiving circuit, or the like. The sending unit may also be sometimes referred to as a transmitting machine, a transmitter, a transmit circuit, or the like.

It may be understood that the transceiver unit 91 and the processing unit 92 are jointly configured to perform a plurality of processes or steps performed by the terminal device in Embodiment 1.

In a feasible implementation, the processing unit 92 is configured to deactivate or suspend dual connectivity based on a second message. The second message is from a first network device or a second network device.

In a feasible implementation, the second message includes indication information. The indication information is used to indicate to deactivate a first secondary cell set. Alternatively, the indication information is used to indicate to suspend a connection to a first secondary cell set. The first secondary cell set includes a primary secondary cell and/or one or more secondary cells other than the primary secondary cell.

In a feasible implementation, the processing unit 92 maintains a radio resource control (RRC) connection between the communications apparatus and the first network device, and deactivates or suspends an RRC connection between the communications apparatus and the second network device. Alternatively, the processing unit 92 maintains an RRC connection between the communications apparatus and the first network device, and disconnects a radio link between the communications apparatus and the second network device.

In a feasible implementation, the processing unit 92 suspends or stops communication with the second network device over a first radio bearer. Alternatively, the processing unit 92 sets a primary path corresponding to the first radio bearer to a master cell group (MCG), and/or the processing unit 92 modifies an uplink data split threshold corresponding to the first radio bearer from a first threshold to a second threshold. Herein, the second threshold is greater than the first threshold. Alternatively, the processing unit 92 suspends communication with a first secondary cell, and maintains radio link monitoring (RLM) for a primary secondary cell in the first secondary cell, where the first secondary cell is a secondary cell communicating with the second network device.

In a feasible implementation, the processing unit 92 stores data transmission status information of the first radio bearer. Alternatively, the processing unit 92 stores configuration information of the first radio bearer.

In a feasible implementation, the processing unit 92 determines the first radio bearer between the communications apparatus and the second network device. The processing unit 92 determines a second radio bearer associated with the first radio bearer. Herein, the second radio bearer is a bearer between the communications apparatus and the first network device, the second radio bearer is used to transmit a suspended or stopped target communication service between the communications apparatus and the second network device, and the target communication service is a communication service performed between the communications apparatus and the second network device over the first radio bearer.

In a feasible implementation, the transceiver unit 91 receives a fifth message sent by the first network device. The processing unit 92 determines, based on the fifth message, the second radio bearer associated with the first radio bearer.

In a feasible implementation, the processing unit 92 suspends or stops communication with the second network device over the first radio bearer. The transceiver unit 91 transmits, over the second radio bearer, communication performed over the first radio bearer.

In a feasible implementation, the processing unit 92 suspends or stops communication with the first secondary cell on a first link.

In a feasible implementation, the processing unit 92 suspends communication with the second network device on the first link over the first radio bearer.

In a feasible implementation, the first link is an uplink or a downlink.

In a feasible implementation, the second message includes first link indication information, and the first link indication information is used to indicate the first link.

In a feasible implementation, the transceiver unit 91 is configured to send first auxiliary information to the first network device or the second network device. The first auxiliary information includes at least one of the following: a type of a bearer that is requested to be configured, a type of a bearer that is to be preferably configured, configuration priorities of different bearers, configuration priorities of different bearer types, and interruption duration of the dual connectivity.

In a feasible implementation, the configuration priorities of the different bearers include a first configuration priority, a second configuration priority, and a third configuration priority that respectively correspond to an SCG bearer, an MCG bearer, and a split bearer. The third configuration priority is the highest.

In a feasible implementation, the processing unit 92 is configured to receive third auxiliary information sent by the first network device or the second network device. The processing unit 92 is configured to perform radio bearer configuration in a dual connectivity mode based on the third auxiliary information. The third auxiliary information is determined by the first network device or the second network device based on any one of: a plurality of pieces of priority information, one or more pieces of radio bearer type information, and identification information of one or more radio bearers.

In a feasible implementation, the transceiver unit 91 is configured to send second auxiliary information to the first network device. The second auxiliary information includes at least one of the following: a reason for deactivation or suspension, deactivation or suspension duration, a service type of a trigger service, where the trigger service is a communication service that triggers deactivation or suspension of the dual connectivity, and service duration of the trigger service.

In a feasible implementation, the first network device is a master base station, and the second network device is a secondary base station. Alternatively, the first network device is a secondary base station, and the second network device is a master base station.

In a feasible implementation, deactivating or suspending the dual connectivity is deactivating or suspending a secondary cell group (SCG), or deactivating or suspending the dual connectivity is deactivating or suspending the second network device.

In a feasible implementation, the transceiver unit 91 is configured to send a third message to the first network device. The third message is used to indicate or request to activate or resume the dual connectivity. The terminal device activates or resumes the dual connectivity.

In a feasible implementation, the transceiver unit 91 receives a fourth message from the first network device or the second network device. The processing unit 92 activates or resumes the dual connectivity based on the fourth message.

In a feasible implementation, the processing unit 92 is configured to activate or resume the RRC connection between the communications apparatus and the second network device, or resume the radio link between the communications apparatus and the second network device.

In a feasible implementation, the processing unit 92 is configured to resume communication with the second network device over the first radio bearer. Alternatively, the processing unit 92 is configured to restore the primary path corresponding to the first radio bearer from the MCG to a first cell group, and/or modify the uplink data split threshold corresponding to the first radio bearer from the second threshold to a third threshold. Herein, the third threshold is less than the second threshold, and the first cell group is a cell group corresponding to the primary path when the dual connectivity is last deactivated or suspended. Alternatively, the processing unit 92 is configured to resume communication with the first secondary cell, and maintain radio link monitoring (RLM) for the primary secondary cell in the first secondary cell.

In a feasible implementation, activating or resuming the dual connectivity is activating or resuming the SCG, or activating or resuming the dual connectivity is activating or resuming the second network device.

In a feasible implementation, the processing unit 92 is configured to activate or resume communication with the second network device over the first radio bearer based on the stored data transmission status information of the first radio bearer. Alternatively, the processing unit 92 is configured to activate or resume communication with the second network device over the first radio bearer based on the stored configuration information of the first radio bearer.

In a feasible implementation, the processing unit 92 is configured to suspend communication with the first network device over the second radio bearer. The second radio bearer is associated with the first radio bearer between the terminal device and the second network device, and the second radio bearer is a radio bearer between the terminal device and the first network device. The processing unit 92 is configured to activate or resume communication with the second network device over the first radio bearer.

In a feasible implementation, the first radio bearer is an SCG bearer or a split bearer.

In a feasible implementation, the processing unit 92 is configured to activate or resume communication with the first secondary cell on a second link.

In a feasible implementation, the processing unit 92 is configured to activate or resume communication with the second network device on the second link over the first radio bearer.

In a feasible implementation, the second link is an uplink or a downlink.

In a feasible implementation, the fourth message includes second link indication information, and the second link indication information is used to indicate the second link.

In specific implementation, the transceiver unit 91 is configured to send a first message to the first network device. For a specific process, refer to the process of sending the first message to the first network device described in step S110 in Embodiment 1. Details are not described herein again. The processing unit 92 is configured to deactivate or suspend the dual connectivity. For a specific process, refer to the process of deactivating or suspending the dual connectivity described in step S120 in Embodiment 1. Details are not described herein again.

Figure 10:
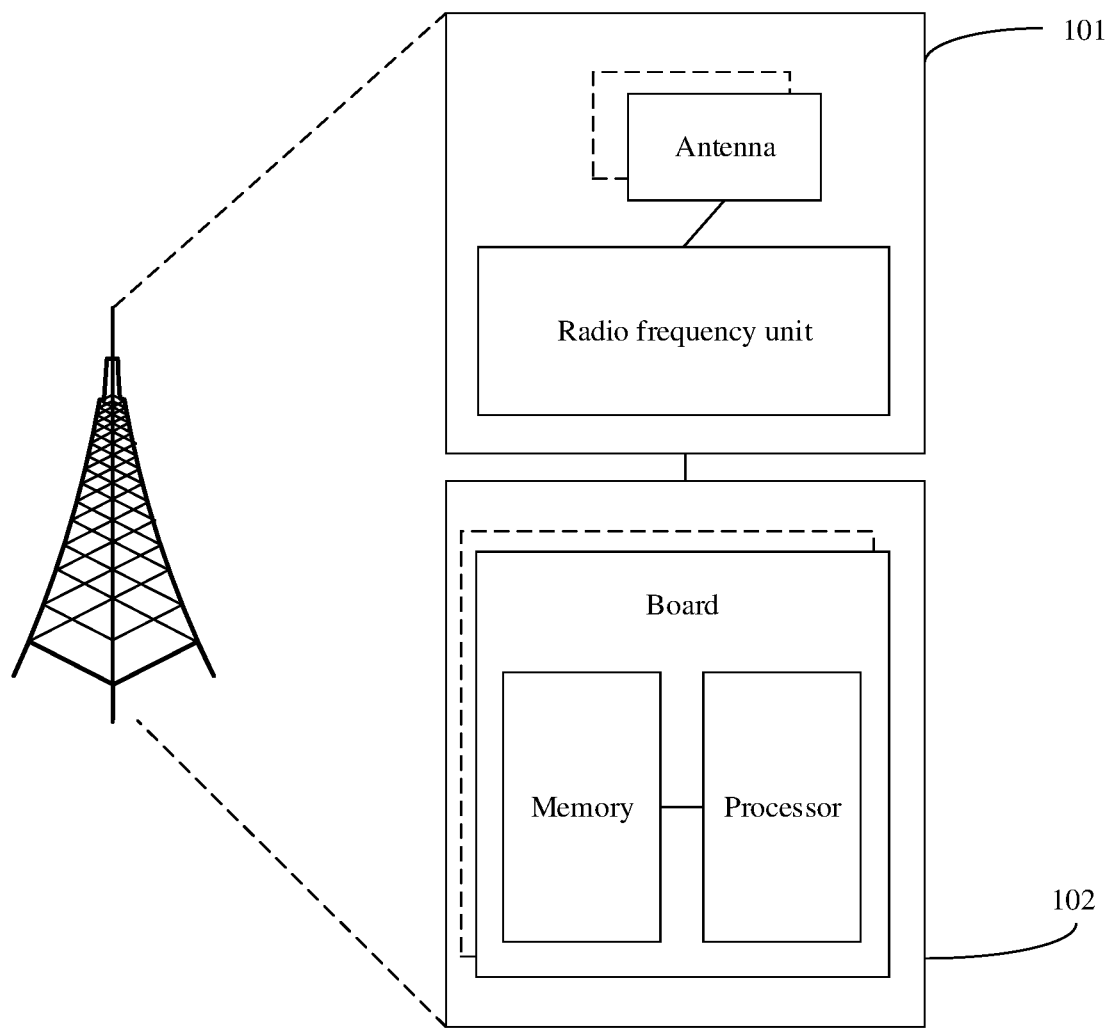
FIG. 10 is a schematic diagram of another structure of a communications apparatus according to an embodiment of this application.

FIG. 10 is a schematic diagram of another structure of a communications apparatus according to an embodiment of this application. As shown in FIG. 10, the communications apparatus may be applied to the communications system shown in FIG. 1, and performs functions of the first network device in Embodiment 1. The communications apparatus may be the first network device, or may be an element or a module inside the first network device. The communications apparatus may include one or more transceiver units 101 and one or more processing units 102. The transceiver unit 101 may be referred to as a transceiving machine, a transceiver circuit, a transceiver, or the like, and may include at least one antenna and at least one radio frequency unit. The transceiver unit 101 part is mainly configured to receive and send a radio frequency signal and perform conversion between the radio frequency signal and a baseband signal, for example, configured to send the indication information in the foregoing embodiment to a terminal device. The processing unit 102 part is mainly configured to perform baseband processing, control an apparatus, and the like. The transceiver unit 101 and the processing unit 102 may be physically disposed together, or may be physically disposed separately, that is, distributed apparatuses. For example, the processing unit 102 may be configured to control the apparatus to perform the process of determining the indication information in Embodiment 1. In specific implementation, the processing unit 102 may include one or more boards. A plurality of boards may jointly support a radio access network (for example, an NR network) of a single access standard, or may support radio access networks of different access standards. The processing unit 102 further includes a memory and a processor. The memory is configured to store necessary instructions and data. The processor is configured to control the apparatus to perform a necessary action, for example, configured to control the apparatus to perform an operation procedure that is related to the apparatus and that is in the foregoing method embodiments. The memory and the processor may serve one or more boards. In other words, the memory and the processor may be disposed on each board. Alternatively, a plurality of boards may share a same memory and a same processor. In addition, a necessary circuit may be further disposed on each board.

It may be understood that the transceiver unit 101 and the processing unit 102 are jointly configured to perform the steps or process of the dual connectivity management method performed by the first network device in Embodiment 1.

In a feasible implementation, a second message includes first link indication information. The first link indication information is used to indicate a first link that is between the terminal device and a second network device and on which communication over a first radio bearer is to be suspended. Alternatively, the first link indication information is used to indicate a first link that is between the terminal device and a first secondary cell and on which communication is to be suspended.

In a feasible implementation, the first link includes an uplink or a downlink.

In a feasible implementation, the transceiver unit is 101 configured to receive second auxiliary information. The second auxiliary information includes at least one of the following: a reason for deactivation or suspension, deactivation or suspension duration, a service type of a trigger service, where the trigger service is a communication service that triggers deactivation or suspension of dual connectivity, and service duration of the trigger service.

In a feasible implementation, the transceiver unit 101 is further configured to send third auxiliary information to the terminal device. The third auxiliary information is used for the terminal device to perform radio bearer configuration in a dual connectivity mode. The third auxiliary information is determined by the processing unit 102 based on any one of: a type of a bearer that is requested to be configured, a type of a bearer that is to be preferably configured, configuration priorities of different bearers, and configuration priorities of different bearer types.

In a feasible implementation, the configuration priorities of the different bearers include a first configuration priority, a second configuration priority, and a third configuration priority that respectively correspond to an SCG bearer, an MCG bearer, and a split bearer. The third configuration priority is the highest.

In a feasible implementation, the transceiver unit 101 is configured to send a fifth message to the terminal device and the second network device. The fifth message is used for the terminal device and the second network device to determine a second radio bearer associated with the first radio bearer. The first radio bearer is a radio bearer between the terminal device and the second network device, and the second radio bearer is a bearer between the terminal device and the first network device. The second radio bearer is used to transmit a suspended target communication service between the terminal device and the second network device. The target communication service is a communication service performed between the terminal device and the second network device over the first radio bearer.

In a feasible implementation, the transceiver unit 101 is configured to receive a third message sent by the terminal device. The third message is used to indicate or request to activate or resume the dual connectivity. The transceiver unit 101 is further configured to send a fourth message to the terminal device in response to the third message. The fourth message is used for the terminal device to activate or resume the dual connectivity.

With reference to the eighth aspect, in a feasible implementation, the fourth message includes second link indication information. The second link indication information is used to indicate a second link that is between the terminal device and the second network device and on which communication over the first radio bearer is to be activated or resumed. Alternatively, the second link indication information is used to indicate a second link that is between the terminal device and the first secondary cell and on which communication is to be activated or resumed.

In a feasible implementation, the second link includes an uplink or a downlink.

In a feasible implementation, the transceiver unit 101 is configured to send a sixth message to the second network device. The sixth message is used for the second network device to deactivate or suspend the dual connectivity.

In a feasible implementation, the transceiver unit 101 is further configured to send a seventh message to the second network device. The seventh message is used for the second network device to activate or resume the dual connectivity.

In a feasible implementation, the first network device is a master base station, and the second network device is a secondary base station. Alternatively, the first network device is a secondary base station, and the second network device is a master base station.

Figure 11:
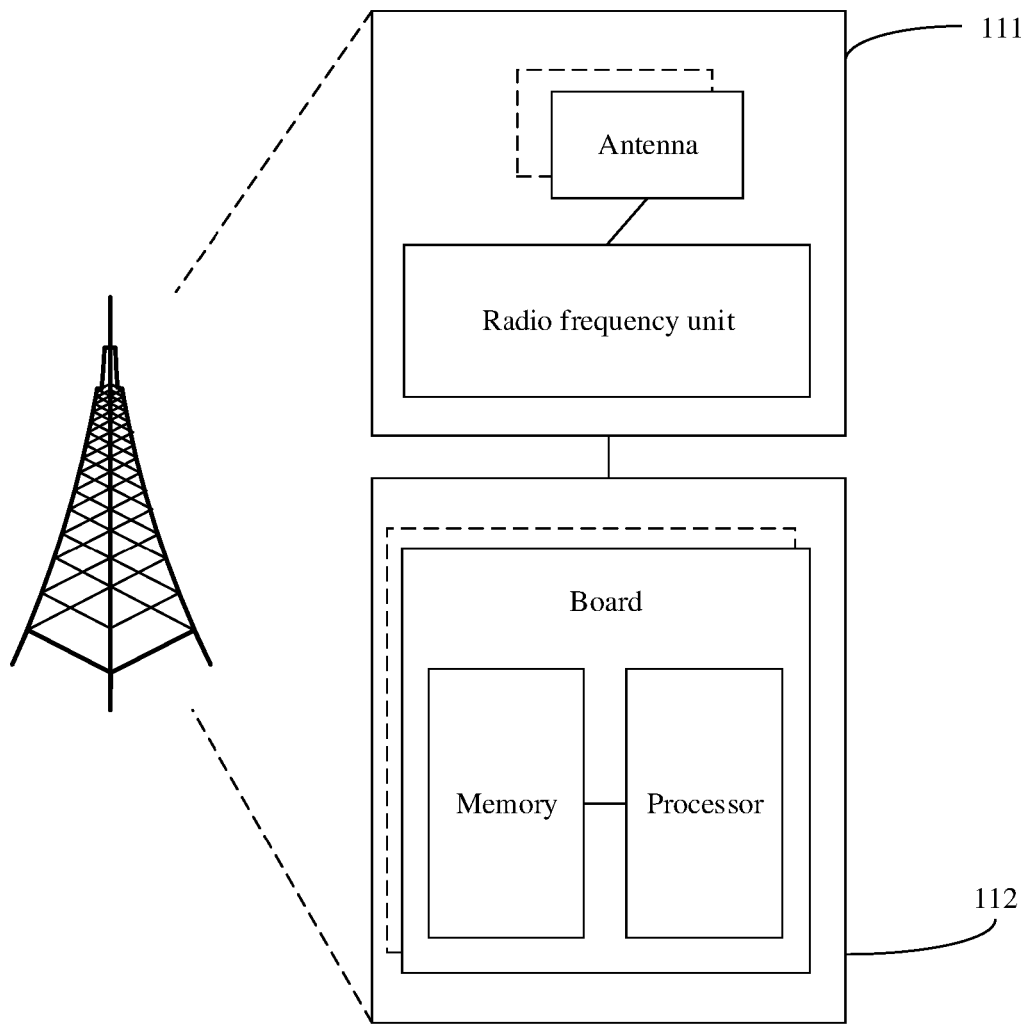
FIG. 11 is a schematic diagram of another structure of a communications apparatus according to an embodiment of this application.

FIG. 11 is a schematic diagram of another structure of a communications apparatus according to an embodiment of this application. As shown in FIG. 11, the communications apparatus may be applied to the communications system shown in FIG. 1, and performs functions of the second network device in Embodiment 1. The communications apparatus may be the second network device, or may be an element or a module inside the second network device. The apparatus may include one or more transceiver units 11 and one or more processing units 112. The transceiver unit 11 may be referred to as a transceiving machine, a transceiver circuit, a transceiver, or the like, and may include at least one antenna and at least one radio frequency unit. The transceiver unit 11 part is mainly configured to receive and send a radio frequency signal and perform conversion between the radio frequency signal and a baseband signal, for example, configured to send the indication information in the foregoing embodiment to a terminal device. The processing unit 112 part is mainly configured to perform baseband processing, control an apparatus, and the like. The transceiver unit 11 and the processing unit 112 may be physically disposed together, or may be physically disposed separately, that is, distributed apparatuses. For example, the processing unit 112 may be configured to control the apparatus to perform the process of determining the indication information in Embodiment 1. In specific implementation, the processing unit 112 may include one or more boards. A plurality of boards may jointly support a radio access network (for example, an NR network) of a single access standard, or may support radio access networks of different access standards. The processing unit 112 further includes a memory and a processor. The memory is configured to store necessary instructions and data. The processor is configured to control the apparatus to perform a necessary action, for example, configured to control the apparatus to perform an operation procedure that is related to the apparatus and that is in the foregoing method embodiments. The memory and the processor may serve one or more boards. In other words, the memory and the processor may be disposed on each board. Alternatively, a plurality of boards may share a same memory and a same processor. In addition, a necessary circuit may be further disposed on each board.

It may be understood that the transceiver unit 11 and the processing unit 112 may be configured to perform the steps or process of the dual connectivity management method performed by the first network device in Embodiment 1.

In a feasible implementation, the processing unit 112 is configured to deactivate or suspend an RRC connection between the communications apparatus and the terminal device. Alternatively, the processing unit 112 is configured to disconnect a radio link between the communications apparatus and the terminal device.

In a feasible implementation, the processing unit 112 is configured to determine a first radio bearer between the terminal device and the second network device. The processing unit 112 is further configured to determine a second radio bearer associated with the first radio bearer. The second radio bearer is a bearer between the second network device and a first network, and the second radio bearer is used to transmit a communication service performed between the terminal device and the second network device over the first radio bearer.

In a feasible implementation, the first network device is a master base station, and the second network device is a secondary base station. Alternatively, the first network device is a secondary base station, and the second network device is a master base station.

Refer to FIG. 9. The transceiver unit 91 and the processing unit 9 may be further configured to perform the process or steps of the dual connectivity management method performed by the terminal device in Embodiment 2.

In a feasible implementation, the transceiver unit 91 is configured to receive a fifth message sent by the first network device. The processing unit 92 is configured to determine, based on the fifth message, the second radio bearer associated with the first radio bearer.

In a feasible implementation, the transceiver unit 91 is configured to send a first message to the first network device. The first message is used to indicate or request to deactivate or suspend dual connectivity. The processing unit 92 is configured to deactivate or suspend the dual connectivity.

In a feasible implementation, the transceiver unit 91 is configured to receive a second message from the first network device or the second network device. The processing unit 92 is configured to deactivate or suspend the dual connectivity based on the second message.

In a feasible implementation, the second message includes indication information. The indication information is used to indicate to deactivate a first secondary cell set or suspend a connection to a first secondary cell set. The first secondary cell set includes a primary secondary cell and/or one or more secondary cells other than the primary secondary cell.

In a feasible implementation, the processing unit 92 is configured to maintain a radio resource control (RRC) connection between the communications apparatus and the first network device, and deactivate or suspend an RRC connection between the communications apparatus and the second network device. Alternatively, the processing unit 92 is configured to maintain an RRC connection between the communications apparatus and the first network device, and disconnect a radio link between the communications apparatus and the second network device.

In a feasible implementation, the processing unit 92 is configured to suspend or stop a target communication service performed between the communications apparatus and the second network device over the first radio bearer. The transceiver unit 91 is configured to transmit the suspended or stopped target communication service over the second radio bearer.

In a feasible implementation, the processing unit 92 is configured to suspend the target communication service performed between the communications apparatus and the second network device on a first link over the first radio bearer. The transceiver unit 91 is configured to transmit the suspended or stopped target communication service on the first link over the second radio bearer.

In a feasible implementation, the first link is an uplink or a downlink.

In a feasible implementation, the second message includes first link indication information, and the first link indication information is used to indicate the first link.

In a feasible implementation, the first radio bearer is an SCG bearer or a split bearer.

In a feasible implementation, the first network device is a master base station, and the second network device is a secondary base station. Alternatively, the first network device is a secondary base station, and the second network device is a master base station.

In a feasible implementation, deactivating or suspending the dual connectivity is deactivating or suspending a secondary cell group (SCG), or deactivating or suspending the dual connectivity is deactivating or suspending the second network device.

In a feasible implementation, the transceiver unit 91 is configured to send a third message to the first network device. The third message is used to indicate or request to activate or resume the dual connectivity. The processing unit 92 is configured to activate or resume the dual connectivity.

In a feasible implementation, the transceiver unit 91 is configured to receive a fourth message from the first network device or the second network device. The processing unit 92 is configured to activate or resume the dual connectivity based on the fourth message.

In a feasible implementation, the processing unit 92 is configured to activate or resume the RRC connection between the communications apparatus and the second network device, or resume the radio link between the communications apparatus and the second network device.

In a feasible implementation, the processing unit 92 is configured to resume transmitting the communication service between the communications apparatus and the second network device over the first radio bearer.

In a feasible implementation, activating or resuming the dual connectivity is activating or resuming the SCG, or activating or resuming the dual connectivity is activating or resuming the second network device.

In a feasible implementation, the processing unit 92 is configured to activate or resume communication with the second network device over the first radio bearer based on the stored data transmission status information of the first radio bearer. Alternatively, the processing unit 92 is configured to activate or resume communication with the second network device over the first radio bearer based on the stored configuration information of the first radio bearer.

In a feasible implementation, the processing unit 92 is configured to activate or resume communication with the second network device on a second link over the first radio bearer.

In a feasible implementation, the second link is an uplink or a downlink.

In a feasible implementation, the fourth message includes second link indication information, and the second link indication information is used to indicate the second link.

Refer to FIG. 10. The transceiver unit 101 and the processing unit 102 may be further configured to perform the process or steps of the dual connectivity management method performed by the first network device in Embodiment 2.

In a feasible implementation, the transceiver unit 101 is configured to receive a first message sent by the terminal device. The first message is used to indicate or request to deactivate or suspend dual connectivity. The transceiver unit 101 is further configured to send a second message to the terminal device in response to the first message. The second message is used for the terminal device to deactivate or suspend the dual connectivity.

With reference to the eleventh aspect, in a feasible implementation, the transceiver unit 101 is configured to receive a third message sent by the terminal device. The third message is used to indicate or request to activate or resume the dual connectivity. The transceiver unit 101 is further configured to send a fourth message to the terminal device in response to the third message. The fourth message is used for the terminal device to activate or resume the dual connectivity.

In a feasible implementation, the second message includes indication information. The indication information is used to indicate to deactivate a first secondary cell or suspend a connection to a first secondary cell set. The first secondary cell set includes a primary secondary cell and/or one or more secondary cells other than the primary secondary cell.

In a feasible implementation, the second message includes first link indication information. The first link indication information is used to indicate a first link that is between the terminal device and the second network device and on which communication over the first radio bearer is to be suspended.

In a feasible implementation, the fourth message includes second link indication information. The second link indication information is used to indicate a second link that is between the terminal device and the second network device and on which communication is to be resumed.

In a feasible implementation, the first link is an uplink or a downlink, and the second link is an uplink or a downlink.

Refer to FIG. 11. The transceiver unit 111 and the processing unit 112 may be further configured to perform the process or steps of the dual connectivity management method performed by the second network device in Embodiment 2.

In a feasible implementation, the transceiver unit 111 is configured to receive a sixth message from the first network device. The processing unit 112 is configured to deactivate or suspend dual connectivity based on the sixth message, or activate or resume a dual connectivity mode based on a seventh message.

In a feasible implementation, the sixth message includes indication information, and the indication information is used to indicate to deactivate a first secondary cell set or suspend a connection to a first secondary cell set. The first secondary cell set includes a primary secondary cell and/or one or more secondary cells other than the primary secondary cell.

With reference to the twelfth aspect, in a feasible implementation, the processing unit 112 is configured to deactivate or suspend an RRC connection between the communications apparatus and the terminal device, or disconnect a radio link between the communications apparatus and the terminal device.

In a feasible implementation, the processing unit 112 is configured to suspend communication with the terminal device over the first radio bearer. The transceiver unit in is configured to communicate with the terminal device over the second radio bearer.

In a feasible implementation, the transceiver unit in is configured to obtain the seventh message sent by the first network device. The processing unit 112 is configured to activate or resume the dual connectivity based on the seventh message.

In a feasible implementation, the processing unit 112 is configured to activate or resume the RRC connection between the communications apparatus and the terminal device, or resume the radio link between the communications apparatus and the terminal device.

In a feasible implementation, the processing unit 112 is configured to suspend communication with the terminal device over the second radio bearer. The processing unit 112 is configured to activate or resume communication with the terminal device over the first radio bearer.

Figure 12:
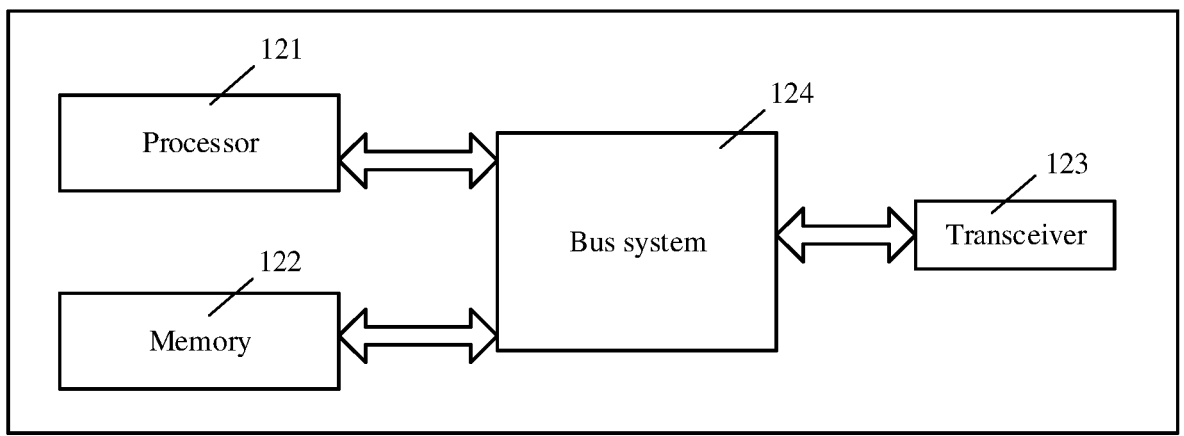
FIG. 12 is a schematic diagram of another structure of a communications apparatus according to an embodiment of this application.

FIG. 12 is a schematic diagram of another structure of a communications apparatus according to an embodiment of this application. The communications apparatus may be the terminal device in Embodiment 1, and may be configured to implement the dual connectivity management method implemented by the terminal device in Embodiment 1. The communications apparatus includes a processor 121, a memory 122, a transceiver 123, and a bus system 124.

The memory 122 includes but is not limited to a RAM, a ROM, an EPROM, or a CD-ROM. The memory 122 is configured to store related instructions and data. The memory 122 stores an executable module or a data structure, a subset thereof, or an extended set thereof, including operation instructions, including various operation instructions and used to implement various operations, and an operating system, including various system programs and used to implement various basic services and process a hardware-based task.

Only one memory is shown in FIG. 12. Certainly, a plurality of memories may alternatively be disposed as required.

The transceiver 123 may be a communications module or a transceiver circuit. In this embodiment of this application, the transceiver 123 is configured to perform the process of sending or receiving the first message or the second message in Embodiment 1.

The processor 121 may be a controller, a central processing unit (CPU), a general-purpose processor, a digital signal processor (DSP), an application specific integrated circuit (ASIC), a field programmable gate array (FPGA), or another programmable logic device, a transistor logic device, a hardware component, or any combination thereof. The processor 121 may implement or execute various example logical blocks, modules, and circuits described with reference to content disclosed in Embodiment 1 of this application, for example, the dual connectivity deactivation or activation process described in Embodiment 1. Alternatively, the processor 121 may be a combination of processors implementing a computing function, for example, a combination of one or more microprocessors, or a combination of the DSP and a microprocessor, or the like.

In specific application, components of the apparatus are coupled together through the bus system 124. In addition to a data bus, the bus system 124 may further include a power bus, a control bus, a status signal bus, and the like. However, for clear description, various types of buses in FIG. 12 are marked as the bus system 124. For ease of illustration, FIG. 12 shows merely a schematic drawing.

It should be noted that, in actual application, the processor in this embodiment of this application may be an integrated circuit chip, and has a signal processing capability. In an implementation process, steps in the foregoing method embodiments can be implemented by using a hardware integrated logical circuit in the processor, or by using instructions in a form of software. The processor may be a general-purpose processor, a digital signal processor (DSP), an application-specific integrated circuit (ASIC), a field programmable gate array (FPGA) or another programmable logic device, a discrete gate or transistor logic device, or a discrete hardware component. The processor may implement or perform the methods, steps, and logical block diagrams that are disclosed in the embodiments of this application.

It may be understood that the memory in this embodiment of this application may be a volatile memory or a nonvolatile memory, or may include a volatile memory and a nonvolatile memory. The nonvolatile memory may be a read-only memory (ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (RAM) and is used as an external cache. For example but not limitation, many forms of RAMs may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus dynamic random access memory (direct rambus RAM, DR RAM). It should be noted that the memory described in this embodiment of this application aims to include but is not limited to these memories and any memory of another proper type.

An embodiment of this application further provides a computer-readable medium. The computer-readable medium stores a computer program, and when the computer program is executed by a computer, the method or steps performed by the terminal device in Embodiment 1 is/are implemented.

An embodiment of this application further provides a computer program product. When the computer program product is executed by a computer, the method or steps performed by the terminal device in Embodiment 1 is/are implemented.

An embodiment of this application further provides a communications apparatus. The communications apparatus may be the terminal device in Embodiment 1. The communications apparatus includes a processor and an interface. The processor is configured to perform the method or steps performed by the terminal device in Embodiment 1. It should be understood that the terminal device may be a chip, and the processor may be implemented by hardware, or may be implemented by software. When the processor is implemented by hardware, the processor may be a logic circuit, an integrated circuit, or the like. When the processor is implemented by software, the processor may be a general-purpose processor, and is implemented by reading software code stored in a memory. The memory may be integrated into the processor, or may be located outside the processor and may exist independently.

Figure 13:
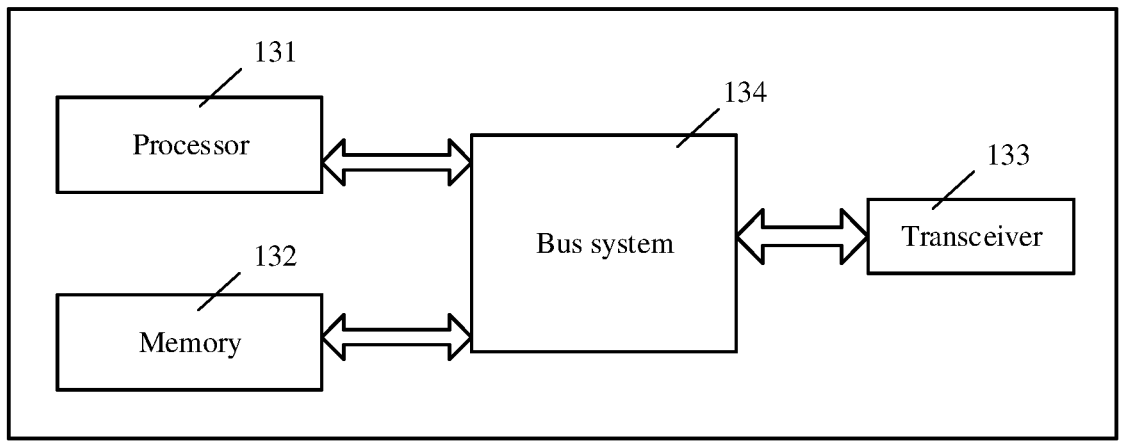
FIG. 13 is a schematic diagram of another structure of a communications apparatus according to an embodiment of this application.

FIG. 13 is a schematic diagram of another structure of a communications apparatus according to an embodiment of this application. The communications apparatus may be the first network device in Embodiment 1, and may be configured to implement the dual connectivity management method implemented by the first network device in Embodiment 1. The apparatus includes a processor 131, a memory 132, a transceiver 133, and a bus system 134.

The memory 132 includes but is not limited to a RAM, a ROM, an EPROM, or a CD-ROM. The memory 132 is configured to store related instructions and data. The memory 132 stores an executable module or a data structure, a subset thereof, or an extended set thereof, including operation instructions, including various operation instructions and used to implement various operations, and an operating system, including various system programs and used to implement various basic services and process a hardware-based task.

Only one memory is shown in FIG. 13. Certainly, a plurality of memories may alternatively be disposed as required.

The transceiver 133 may be a communications module or a transceiver circuit. In this embodiment of this application, the transceiver 133 is configured to perform the process of sending the second message or the fifth message in Embodiment 1.

The processor 131 may be a controller, a CPU, a general-purpose processor, a DSP, an ASIC, an FPGA, or another programmable logic device, a transistor logic device, a hardware component, or any combination thereof. The processor 131 may implement or execute various example logical blocks, modules, and circuits described with reference to content disclosed in Embodiment 1 of this application. Alternatively, the processor 131 may be a combination of processors implementing a computing function, for example, a combination of one or more microprocessors, or a combination of the DSP and a microprocessor, or the like.

In specific application, components of the apparatus are coupled together through the bus system 134. In addition to a data bus, the bus system 134 may further include a power bus, a control bus, a status signal bus, and the like. However, for clear description, various types of buses in FIG. 13 are marked as the bus system 134. For ease of illustration, FIG. 13 shows merely a schematic drawing.

It should be noted that, in actual application, the processor in this embodiment of this application may be an integrated circuit chip, and has a signal processing capability. In an implementation process, steps in the foregoing method embodiments can be implemented by using a hardware integrated logical circuit in the processor, or by using instructions in a form of software. The processor may be a general-purpose processor, a digital signal processor (DSP), an application-specific integrated circuit (ASIC), a field programmable gate array (FPGA) or another programmable logic device, a discrete gate or transistor logic device, or a discrete hardware component. The processor may implement or perform the methods, steps, and logical block diagrams that are disclosed in the embodiments of this application.

It may be understood that the memory in this embodiment of this application may be a volatile memory or a nonvolatile memory, or may include a volatile memory and a nonvolatile memory. The nonvolatile memory may be a read-only memory (ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (RAM) and is used as an external cache. For example but not limitation, many forms of RAMs may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus dynamic random access memory (direct rambus RAM, DR RAM). It should be noted that the memory described in this embodiment of this application aims to include but is not limited to these memories and any memory of another proper type.

An embodiment of this application further provides a computer-readable medium. The computer-readable medium stores a computer program, and when the computer program is executed by a computer, the method or steps performed by the first network device in Embodiment 1 is/are implemented.

An embodiment of this application further provides a computer program product. When the computer program product is executed by a computer, the method or steps performed by the first network device in Embodiment 1 is/are implemented.

An embodiment of this application further provides an apparatus. The apparatus may be the first network device in Embodiment 1. The apparatus includes a processor and an interface. The processor is configured to perform the method or steps performed by the first network device in Embodiment 1. It should be understood that the first network device may be a chip, and the processor may be implemented by hardware, or may be implemented by software. When the processor is implemented by hardware, the processor may be a logic circuit, an integrated circuit, or the like. When the processor is implemented by software, the processor may be a general-purpose processor, and is implemented by reading software code stored in a memory. The memory may be integrated into the processor, or may be located outside the processor and may exist independently.

Figure 14:
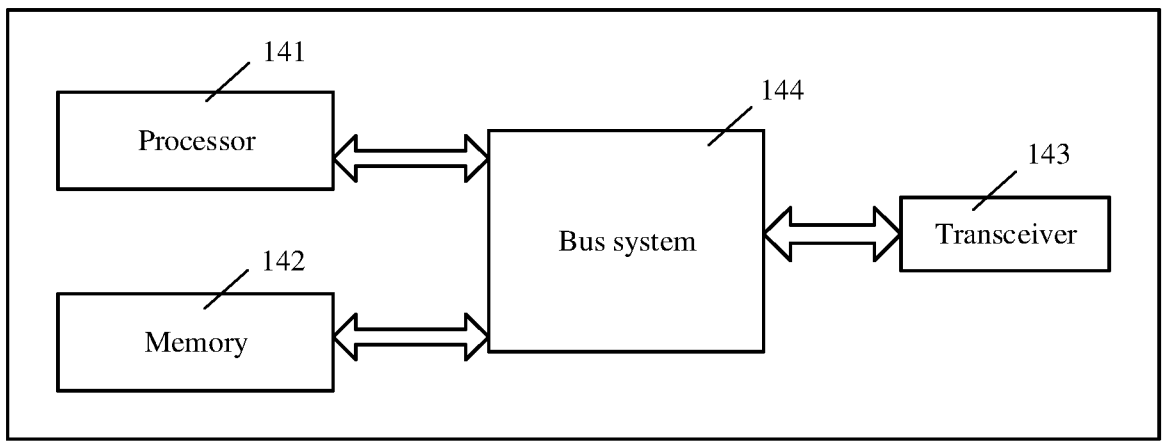
FIG. 14 is a schematic diagram of another structure of a communications apparatus according to an embodiment of this application.

FIG. 14 is a schematic diagram of another structure of a communications apparatus according to an embodiment of this application. The communications apparatus may be the second network device in Embodiment 1, and may be configured to implement the dual connectivity management method implemented by the second network device in Embodiment 1. The apparatus includes a processor 141, a memory 142, a transceiver 143, and a bus system 144.

The memory 142 includes but is not limited to a RAM, a ROM, an EPROM, or a CD-ROM. The memory 142 is configured to store related instructions and data. The memory 142 stores an executable module or a data structure, a subset thereof, or an extended set thereof including operation instructions, including various operation instructions and used to implement various operations, and an operating system, including various system programs and used to implement various basic services and process a hardware-based task.

Only one memory is shown in FIG. 14. Certainly, a plurality of memories may alternatively be disposed as required.

The transceiver 143 may be a communications module or a transceiver circuit. In this embodiment of this application, the transceiver 143 is configured to perform the process of sending the indication information in Embodiment 1.

The processor 141 may be a controller, a CPU, a general-purpose processor, a DSP, an ASIC, an FPGA, or another programmable logic device, a transistor logic device, a hardware component, or any combination thereof. The processor 141 may implement or execute various example logical blocks, modules, and circuits described with reference to content disclosed in the embodiments of this application. Alternatively, the processor 141 may be a combination of processors implementing a computing function, for example, a combination of one or more microprocessors, or a combination of the DSP and a microprocessor, or the like.

In specific application, components of the apparatus are coupled together through the bus system 144. In addition to a data bus, the bus system 144 may further include a power bus, a control bus, a status signal bus, and the like. However, for clear description, various types of buses in FIG. 14 are marked as the bus system 144. For ease of illustration, FIG. 14 shows merely a schematic drawing.

It should be noted that, in actual application, the processor in this embodiment of this application may be an integrated circuit chip, and has a signal processing capability. In an implementation process, steps in the foregoing method embodiments can be implemented by using a hardware integrated logical circuit in the processor, or by using instructions in a form of software. The processor may be a general-purpose processor, a digital signal processor (digital signal Processor, DSP), an application-specific integrated circuit (application specific integrated circuit, ASIC), a field programmable gate array (field programmable gate array, FPGA) or another programmable logic device, a discrete gate or transistor logic device, or a discrete hardware component. The processor may implement or perform the methods, steps, and logical block diagrams that are disclosed in the embodiments of this application.

It may be understood that the memory in this embodiment of this application may be a volatile memory or a nonvolatile memory, or may include a volatile memory and a nonvolatile memory. The nonvolatile memory may be a read-only memory (ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (RAM) and is used as an external cache. For example but not limitation, many forms of RAMs may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus dynamic random access memory (direct rambus RAM, DR RAM). It should be noted that the memory described in this embodiment of this application aims to include but is not limited to these memories and any memory of another proper type.

An embodiment of this application further provides a computer-readable medium. The computer-readable medium stores a computer program, and when the computer program is executed by a computer, the method or steps performed by the second network device in Embodiment 1 is/are implemented.

An embodiment of this application further provides a computer program product. When the computer program product is executed by a computer, the method or steps performed by the second network device in Embodiment 1 is/are implemented.

An embodiment of this application further provides an apparatus. The apparatus may be the network device in Embodiment 1. The apparatus includes a processor and an interface. The processor is configured to perform the method or steps performed by the second network device in Embodiment 1. It should be understood that the network device may be a chip, and the processor may be implemented by hardware, or may be implemented by software. When the processor is implemented by hardware, the processor may be a logic circuit, an integrated circuit, or the like. When the processor is implemented by software, the processor may be a general-purpose processor, and is implemented by reading software code stored in a memory. The memory may be integrated into the processor, or may be located outside the processor and may exist independently.

Refer to FIG. 12. The communications apparatus may alternatively be the terminal device in Embodiment 2, and may be configured to implement the dual connectivity management method implemented by the terminal device in Embodiment 2. For a specific process, refer to the foregoing description. Details are not described herein again.

An embodiment of this application further provides a computer-readable medium. The computer-readable medium stores a computer program, and when the computer program is executed by a computer, the method or steps performed by the terminal device in Embodiment 2 is/are implemented.

An embodiment of this application further provides a computer program product. When the computer program product is executed by a computer, the method or steps performed by the terminal device in Embodiment 2 is/are implemented.

An embodiment of this application further provides a communications apparatus. The communications apparatus may be the terminal device in Embodiment 2. The communications apparatus includes a processor and an interface. The processor is configured to perform the method or steps performed by the terminal device in Embodiment 2. It should be understood that the terminal device may be a chip, and the processor may be implemented by hardware, or may be implemented by software. When the processor is implemented by hardware, the processor may be a logic circuit, an integrated circuit, or the like. When the processor is implemented by software, the processor may be a general-purpose processor, and is implemented by reading software code stored in a memory. The memory may be integrated into the processor, or may be located outside the processor and may exist independently.

Refer to FIG. 13. The communications apparatus may alternatively be the first network device in Embodiment 2, and may be configured to implement the dual connectivity management method implemented by the first network device in Embodiment 2. For specific content, refer to the foregoing description. Details are not described herein again.

An embodiment of this application further provides a computer-readable medium. The computer-readable medium stores a computer program, and when the computer program is executed by a computer, the method or steps performed by the first network device in Embodiment 2 is/are implemented.

An embodiment of this application further provides a computer program product. When the computer program product is executed by a computer, the method or steps performed by the first network device in Embodiment 2 is/are implemented.

An embodiment of this application further provides an apparatus. The apparatus may be the first network device in Embodiment 2. The apparatus includes a processor and an interface. The processor is configured to perform the method or steps performed by the first network device in Embodiment 2. It should be understood that the first network device may be a chip, and the processor may be implemented by hardware, or may be implemented by software. When the processor is implemented by hardware, the processor may be a logic circuit, an integrated circuit, or the like. When the processor is implemented by software, the processor may be a general-purpose processor, and is implemented by reading software code stored in a memory. The memory may be integrated into the processor, or may be located outside the processor and may exist independently.

Refer to FIG. 14. The communications apparatus may alternatively be the second network device in Embodiment 2, and may be configured to implement the dual connectivity management method implemented by the second network device in Embodiment 2. For specific content, refer to the foregoing description. Details are not described herein again.

An embodiment of this application further provides a computer-readable medium. The computer-readable medium stores a computer program, and when the computer program is executed by a computer, the method or steps performed by the second network device in Embodiment 2 is/are implemented.

An embodiment of this application further provides a computer program product. When the computer program product is executed by a computer, the method or steps performed by the second network device in Embodiment 2 is/are implemented.

An embodiment of this application further provides an apparatus. The apparatus may be the network device in Embodiment 2. The apparatus includes a processor and an interface. The processor is configured to perform the method or steps performed by the second network device in Embodiment 2. It should be understood that the network device may be a chip, and the processor may be implemented by hardware, or may be implemented by software. When the processor is implemented by hardware, the processor may be a logic circuit, an integrated circuit, or the like. When the processor is implemented by software, the processor may be a general-purpose processor, and is implemented by reading software code stored in a memory. The memory may be integrated into the processor, or may be located outside the processor and may exist independently.

All or a part of the foregoing method embodiments may be implemented by software, hardware, firmware, or any combination thereof. When software is used to implement the embodiments, all or a part of the embodiments may be implemented in a form of a computer program product. The computer program product includes one or more computer instructions. When the computer instructions are loaded and executed on a computer, the procedures or functions according to the embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, for example, a server or a data center, integrating one or more usable media. The usable medium may be a magnetic medium (for example, a floppy disk, a hard disk, or a magnetic tape), an optical medium (for example, a high-density digital video disc (digital video disc, DVD)), a semiconductor medium (for example, a solid-state drive (solid state disk, SSD)), or the like.

It should be understood that the terms "system" and "network" may be used interchangeably in the embodiments of this application. The term "and/or" in the embodiments describes only an association relationship for describing associated objects and represents that three relationships may exist. For example, A and/or B may represent the following three cases: Only A exists, both A and B exist, and only B exists. In addition, the character "/" in this specification usually indicates an "or" relationship between the associated objects.

A person of ordinary skill in the art may be aware that, in combination with the examples described in the embodiments disclosed in this specification, units and algorithm steps can be implemented by electronic hardware, computer software, or a combination thereof. To clearly describe the interchangeability between the hardware and the software, the foregoing has generally described compositions and steps of each example according to functions. Whether the functions are executed by hardware or software depends on particular applications and design constraints of the technical solutions. A person skilled in the art may use different methods to implement the described functions for each particular application, but it should not be considered that the implementation goes beyond the scope of this application.

In the embodiments provided in this application, it should be understood that the disclosed system, apparatus, and method may be implemented in other manners. For example, the described apparatus embodiments are merely examples. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

In conclusion, the foregoing descriptions are merely example embodiments of the technical solutions of this application, but are not intended to limit the protection scope of this application. Any modification, equivalent replacement, or improvement made without departing from the spirit and principle of this application shall fall within the protection scope of this application.

What is claimed is:
1. A dual connectivity management method, comprising:
    determining, by a terminal device that communicates with a first network device and a second network device in a dual connectivity mode, that dual connectivity needs to be deactivated or suspended;
    sending a first message by the terminal device to the first network device in response to the terminal device determining that the dual connectivity needs to be deactivated or suspended, wherein the first message at least one of indicates or requests at least one of deactivation or suspension of the dual connectivity; and performing the at least one of the deactivating or the suspending the dual connectivity after sending the first message to the first network device by the terminal device.

2. The method according to claim 1, wherein the at least one of the deactivating or the suspending the dual connectivity comprises:

performing at least one of the deactivating or suspending the dual connectivity based on a second message, wherein the second message is from at least one of the first network device or the second network device.

3. The method according to claim 2, wherein the second message comprises indication information, wherein the indication information indicates to at least one of deactivate a first secondary cell set, or suspend a connection to a first secondary cell set, and wherein the first secondary cell set comprises at least one of a primary secondary cell or one or more secondary cells other than the primary secondary cell.

4. The method according to claim 1, wherein the at least one of the deactivating or the suspending the dual connectivity comprises performing at least one of:

maintaining a radio resource control (RRC) connection between the terminal device and the first network device, and at least one of deactivating or suspending an RRC connection between the terminal device and the second network device; or maintaining an RRC connection between the terminal device and the first network device, and disconnecting a radio link between the terminal device and the second network device.

5. The method according to claim 1, wherein the deactivating or suspending the dual connectivity comprises at least one of:

performing at least one of suspending or stopping communication over a first radio bearer, wherein the first radio bearer is a radio bearer between the terminal device and the second network device;

performing at least one of setting a primary path corresponding to the first radio bearer to a master cell group (MCG) or modifying an uplink data split threshold corresponding to the first radio bearer from a first threshold to a second threshold, wherein the second threshold is greater than the first threshold; or suspending communication with a first secondary cell, and maintaining radio link monitoring (RLM) for a primary secondary cell in the first secondary cell, wherein the first secondary cell is a secondary cell communicating with the second network device.

6. The method according to claim 1, further comprising:
sending first auxiliary information to the first network device or the second network device, wherein the first auxiliary information comprises at least one of:
a type of a bearer that is requested to be configured;
a type of a bearer that is to be preferably configured;
configuration priorities of different bearers;
configuration priorities of different bearer types; or
an interruption duration of the dual connectivity.

7. The method according to claim 1, further comprising:
sending second auxiliary information to the first network device, wherein the second auxiliary information comprises at least one of:
a reason for deactivation or suspension;
a deactivation or suspension duration;
a service type of a trigger service, wherein the trigger service is a communication service that triggers deactivation or suspension of the dual connectivity; or
a service duration of the trigger service.

8. The method according to claim 1, wherein the at least one of the deactivating or the suspending the dual connectivity is deactivating or suspending at least one of a secondary cell group (SCG), or the second network device.

9. A dual connectivity management method, comprising:
receiving, by a first network device that communicates with a second network device and a terminal device in a dual connectivity mode, a first message from the terminal device, wherein the first message is used to indicate or request to deactivate or suspend dual connectivity, wherein the first message indicates that the terminal device has determined, prior to the terminal device sending the first message, that dual connectivity needs to be deactivated or suspended; and sending, by a first network device, to the terminal device in response to the first message, a second message, wherein the second message indicates to the terminal device to at least one of deactivate or suspend the dual connectivity.

10. The method according to claim 9, wherein the second message comprises indication information, wherein the indication information indicates to the terminal device to at least one of deactivate a first secondary cell set, or suspend a connection to a first secondary cell set, and wherein the first secondary cell set comprises at least one of a primary secondary cell or one or more secondary cells other than the primary secondary cell.

11. The method according to claim 9, further comprising:
receiving first auxiliary information sent by the terminal device, wherein the first auxiliary information comprises at least one of:
a type of a bearer that is requested to be configured;
a type of a bearer that is to be preferably configured;
configuration priorities of different bearers;
configuration priorities of different bearer types; or
an interruption duration of the dual connectivity.

12. The method according to claim 9, further comprising:
receiving a third message from the terminal device, wherein the third message at least one of indicates or requests to at least one of activate or resume the dual connectivity; and
sending a fourth message to the terminal device, wherein the fourth message indicates to the terminal device to at least one of activate or resume the dual connectivity.

13. An apparatus, comprising:
one or more processors; and
one or more memories coupled to the one or more processors and storing programming instructions for execution by the one or more processors for communication with a first network device and a second network device in a dual connectivity mode, the programming instructions including instructions for:
determining, by the apparatus, that dual connectivity needs to be deactivated or suspended;
sending a first message to the first network device in response to the apparatus determining that the dual connectivity needs to be deactivated or suspended, wherein the first message at least one of indicates or requests to at least one of deactivate or suspend dual connectivity; and
deactivating or suspending the dual connectivity after sending the first message to the first network device.

14. The apparatus according to claim 13, wherein the at least one of the deactivating or suspending the dual connectivity comprises:
performing at least one of deactivating or suspending the dual connectivity based on a second message, wherein the second message is from at least one of the first network device or the second network device.

15. The apparatus according to claim 14, wherein the second message comprises indication information, wherein the indication information indicates to at least one of deactivate a first secondary cell set, or suspend a connection to a first secondary cell set, and wherein the first secondary cell set comprises at least one of a primary secondary cell or one or more secondary cells other than the primary secondary cell.

16. The apparatus according to claim 13, wherein the at least one of the deactivating or the suspending the dual connectivity comprises performing at least one of:
maintaining a radio resource control (RRC) connection between the apparatus and the first network device, and at least one of deactivating or suspending an RRC connection between the apparatus and the second network device; or
maintaining an RRC connection between the apparatus and the first network device, and disconnecting a radio link between the apparatus and the second network device.

17. The apparatus according to claim 13, wherein the at least one of the deactivating or the suspending the dual connectivity comprises at least one of:
performing at least one of suspending or stopping communication over a first radio bearer, wherein the first radio bearer is a radio bearer between the apparatus and the second network device;
performing at least one of setting a primary path corresponding to the first radio bearer to a master cell group (MCG), or modifying an uplink data split threshold corresponding to the first radio bearer from a first threshold to a second threshold, wherein the second threshold is greater than the first threshold; or
suspending communication with a first secondary cell, and maintaining radio link monitoring (RLM) for a primary secondary cell in the first secondary cell, wherein the first secondary cell is a secondary cell communicating with the second network device.

18. The apparatus according to claim 13, wherein the program instructions further include instructions for:
sending first auxiliary information to at least one of the first network device or the second network device, wherein the first auxiliary information comprises at least one of:
a type of a bearer that is requested to be configured;
a type of a bearer that is to be preferably configured;
configuration priorities of different bearers;
configuration priorities of different bearer types; or
an interruption duration of the dual connectivity.

19. The apparatus according to claim 13, wherein the program instructions further include instructions for:
sending second auxiliary information to the first network device, wherein the second auxiliary information comprises at least one of:
a reason for deactivation or suspension;
a deactivation or suspension duration;
a service type of a trigger service, wherein the trigger service is a communication service that triggers at least one of deactivation or suspension of the dual connectivity; or
service duration of the trigger service.

20. The apparatus according to claim 13, wherein the at least one of the deactivating or the suspending the dual connectivity comprises performing at least one of deactivating or suspending at least one of a secondary cell group (SCG), or the second network device.

* * * * *

UNITED STATES PATENT AND TRADEMARK OFFICE
CERTIFICATE OF CORRECTION

| | | |
|---|---|---|
| PATENT NO. | : 12,108,474 B2 | Page 1 of 1 |
| APPLICATION NO. | : 17/704538 | |
| DATED | : October 1, 2024 | |
| INVENTOR(S) | : Chang et al. | |

It is certified that error appears in the above-identified patent and that said Letters Patent is hereby corrected as shown below:

On the Title Page

Item (73), in Column 1, in "Assignee", Line 1, delete "CO," and insert -- CO., --.

Signed and Sealed this
Seventh Day of January, 2025

Derrick Brent
*Acting Director of the United States Patent and Trademark Office*